(12) United States Patent
Milanovic et al.

(10) Patent No.: US 12,529,766 B2
(45) Date of Patent: Jan. 20, 2026

(54) LIDAR SYSTEM WITH PROJECTION CAPABILITY

(71) Applicant: Mirrorcle Technologies, Inc., Richmond, CA (US)

(72) Inventors: Veljko Milanovic, Richmond, CA (US); Ljubisa Ristic, San Jose, CA (US); Abhishek Kasturi, Pleasanton, CA (US); Daniel Lovell, El Cerrito, CA (US)

(73) Assignee: MIRRORCLE TECHNOLOGIES, INC., Richmond, CA (US)

( * ) Notice: Subject to any disclaimer, the term of this patent is extended or adjusted under 35 U.S.C. 154(b) by 1024 days.

(21) Appl. No.: 17/592,408

(22) Filed: Feb. 3, 2022

(65) Prior Publication Data
US 2023/0204728 A1    Jun. 29, 2023

Related U.S. Application Data

(60) Provisional application No. 63/293,316, filed on Dec. 23, 2021.

(51) Int. Cl.
| | |
|---|---|
| *G01S 7/481* | (2006.01) |
| *G01B 11/24* | (2006.01) |
| *G01S 7/4865* | (2020.01) |
| *G01S 17/42* | (2006.01) |
| *G01S 17/58* | (2006.01) |

(52) U.S. Cl.
CPC ............ *G01S 7/4817* (2013.01); *G01S 17/42* (2013.01)

(58) Field of Classification Search
CPC .... G01S 7/4817; G01S 7/4865; G01S 7/4915; G01S 17/42; G01S 17/58; G01S 7/4814; G01S 17/931; G01S 7/4815; G01S 7/4816; G01S 7/4813; G01B 11/24
USPC ........................................................ 356/5.01
See application file for complete search history.

(56) References Cited

U.S. PATENT DOCUMENTS

2005/0195383 A1    9/2005 Breed et al.

OTHER PUBLICATIONS

Milanović, V., Castelino, K., McCormick, D., "Highly Adaptable MEMS-based Display with Wide Projection Angle," 2007 IEEE 20th International Conference on Micro Electro Mechanical Systems (MEMS), Hyogo, Japan, Jan. 21-25, 2007, pp. 143-146.
Ali, R., Liu, R., He, Y., Nayyar, A., Qureshi, B., "Systematic Review of Dynamic Multi-Object Identification and Localization: Techniques and Technologies," IEEE Access, vol. 9, pp. 122924-122950.

(Continued)

*Primary Examiner* — Daniel L Murphy
(74) *Attorney, Agent, or Firm* — JDI PATENT; Joshua D. Isenberg

(57) ABSTRACT

A combined sensing and projection apparatus includes a LIDAR sensor, a scan module, a unified processor and a mechanical mounting. The LIDAR sensor is configured to detect light and sense a physical property of an object or environment. The scan module has a micro-electromechanical system (MEMS) mirror configured to deflect one or more laser beams to project vector graphic content related to the physical property of the object. The unified processor is configured to reduce processing delays by fusion of processing of both vector graphic content and determination of the physical property of the object. The scan module and sensor are attached to the mechanical mounting.

50 Claims, 20 Drawing Sheets

(56) References Cited

OTHER PUBLICATIONS

Andersson, N., Argyrou, A., Nagele, F., Ubis, F., Campos, UE., Ortiz de Zarate, M., Wilterdink, R., "AR-Enhanced Human-Robot-Interaction—Methodologies, Algorithms, Tools," 6th CIRP Conference on Assembly Technologies and Systems (CATS), Procedia CIRP, vol. 44, 2016, pp. 193-198.

Kasturi, A., Milanovic, V., Lovell, D., Hu, F., Ho, D., Su, Y., Ristic, Lj., "Comparison of MEMS Mirror LiDAR Architectures," Proc. SPIE 11293, MOEMS and Miniaturized Systems XIX, 112930B, San Francisco, CA, Feb. 28, 2020.

Milanović, V., "Linearized Gimbal-less Two-Axis MEMS Mirrors," 2009 Conference on Optical Fiber Communication, San Diego, Ca, USA, Mar. 22-26, 2009, pp. 1-3.

Milanović, V., Kasturi, A., Hachtel, V., "High brightness MEMS mirror based head-up display (HUD) modules with wireless data streaming capability," Proc. SPIE 9375, MOEMS and Miniaturized Systems XIV, 93750A, San Francisco, CA, USA, Feb. 27, 2015.

Miner, A., Milanovic, V., "High Temperature Operation of Gimbal-less Two-Axis Micromirrors," 2007 IEEE/LEOS International Conference on Optical MEMS and Nanophotonics, Hualien, Taiwan, Aug. 12-Jul. 16, 2007, pp. 91-92.

Sheridan, TB., "Human-Robot Interaction: Status and Challenges," Human Factors, vol. 58, No. 4, Jun. 2016, pp. 525-532.

Vogel, C., Poggendorf, M., Walter, C., Elkmann, N., "Towards Safe Physical Human-Robot Collaboration: A Projection-based Safety System," 2011 IEEE/RSJ International Conference on Intelligent Robots and Systems, San Francisco, CA, USA, Sep. 25-30, 2011, pp. 3355-3360.

Vogel, C., Walter C., Elkmann, N., "A Projection-based Sensor System for Safe Physical Human-Robot Collaboration," 2013 IEEE/RSJ International Conference on Intelligent Robots and Systems (IROS), Tokyo, Japan, Nov. 3-7, 2013, pp. 5359-5364.

Vogel, C., Walter C., Elkmann, N., "Exploring the possibilities of supporting robot-assisted work places using a projection-based sensor system," 2012 IEEE International Symposium on Robotic and Sensors Environments Proceedings, Magdeburg, Germany, Nov. 16-18, 2012, pp. 67-72.

Wengefeld, T., Höchemer, D., Lewandowski, B., Kohler, M., Beer, M., Gross, H., "A Laser Projection System for Robot Intention Communication and Human Robot Interaction," 2020 29th IEEE International Conference on Robot and Human Interactive Communication (RO-MAN), Virtual Conference, Aug. 31-Sep. 4, 2020, pp. 259-265.

Zaeh, MF., Vogl, W., "Interactive Laser-Projection for Programming Industrial Robots," 2006 IEEE/ACM International Symposium on Mixed and Augmented Reality, Santa Barbara, CA, USA, Oct. 22-25, 2006, pp. 125-128.

Office Action dated Aug. 8, 2025 for U.S. Appl. No. 17/673,534.

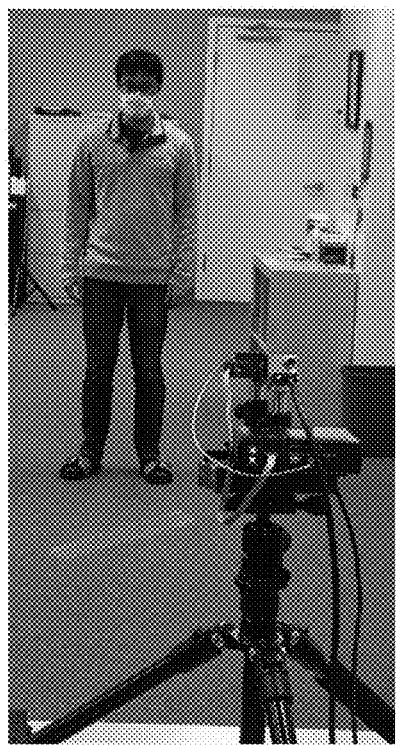 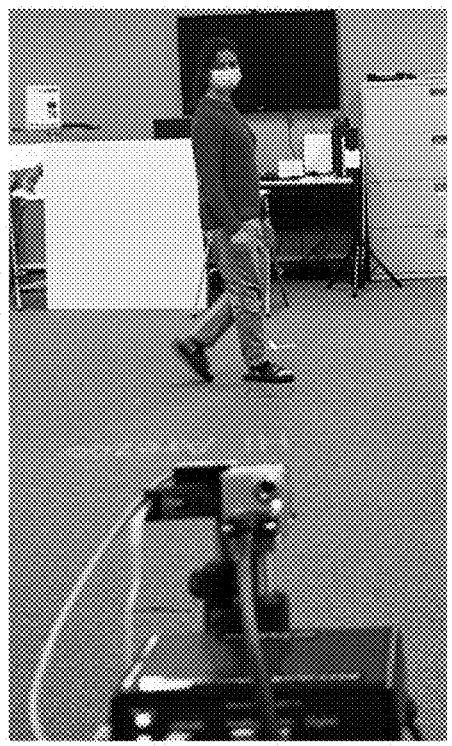
Fig. 19A  Fig. 19B
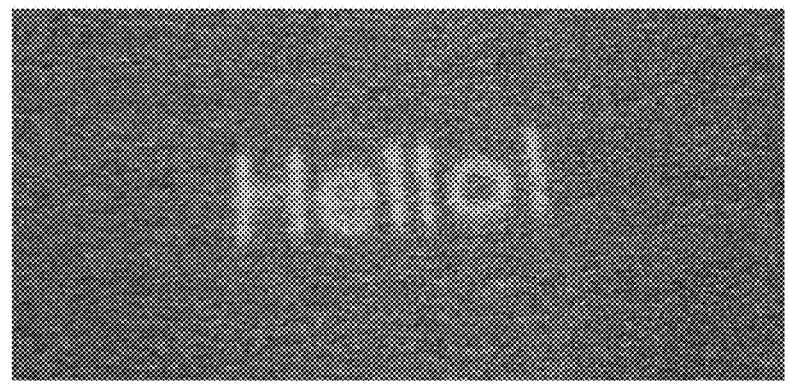
Fig. 19C

LIDAR SYSTEM WITH PROJECTION CAPABILITY

CLAIM OF PRIORITY

This application claims the priority benefit of U.S. Provisional Patent Application No. 63/293,316 filed Dec. 23, 2021, the entire disclosures of which are incorporated herein by reference.

BACKGROUND

Sensors and actuators are essential parts of smart technology that have been widely used today in many aspects of human activities including industrial automation and transportation. We are also witnessing massive use of sensors in commercial, consumer, medical and many other products. However, in many of these applications sensors are still far from achieving optimal performance, and very often what is lacking is timely display of results or messages intended for users. This is particularly true in robotics and similar working environments that require interaction between machines and humans. There is an obvious need for efficient machine-human interaction and intention communication to improve safety. Today such solutions are in their infancy.

In addition, almost many useful machines are typically battery operated, consequently sub-systems that augment the capabilities of such machines must be low-power solutions. In the case of airborne drones, it is also critical that solutions are ultra-light weight and of small form factor.

Prior work has been presented in which robots are equipped with various sensors including inertial, optical, ultrasonic, etc. to aid the machine to perform its tasks more efficiently. However, only recently have there been innovations towards addressing the specific need of human-robot interaction. Existing solutions are half measures where cameras and LIDAR sensors are able to detect and identify objects within the sensor's field of view, but the intent to communicate effectively with the user is typically based on flashing bulbs, rotational lights, or screens and LED based projectors which are very bulky and energy inefficient.

It is within this context that aspects of the present disclosure arise.

OBJECTIVES

The objective of the work that led to aspects of the present disclosure was to develop and demonstrate a sensing system working alongside with projecting capabilities based on an optical-MEMS Mirror steering technology. Introducing MEMS Mirror-based solutions such as vector graphics laser projection (VGLP) for machine-human interaction brings significant improvement in performance and safety. MEMS Mirror based solutions offer systems with lowest power consumption, lowest weight, small form factor, and low cost, as well as high contrast programmable and animated messaging that is far superior to flashing bulb or rotating light. The present disclosure describes solution having a sensing system and projection system fused together at an operational level. The sensing system could be based on any suitable sensor such as temperature, pressure, humidity, radar, or an electromagnetic radiation sensor such as an optical sensor based sensing that can rely on the reflected brightness, time of flight, imaging or other optical sensing methodologies. The projection system uses vector graphics projection based on a MEMS Mirror to provide high contrast information in real time on any surface in daytime and night conditions. The fusion of sensing and projection systems allows for fast reaction, and immediate feedback to user which could be done in different ways, by projecting data, projecting warning signs, giving directions, highlighting different paths, etc. Also, multiple VGLP projectors or different colors from a single VGLP projector can be used to enrich communications and improve quality of information. For example, different color can signify proximity to danger, or different colors can be used to mark different set of data, or designated to specific user, etc.

With single fused unit the process of sensing or detecting and projecting data in a timely manner, in a different form and shape, without delay, greatly improves safety and allows for fast corrective action when needed.

An additional objective was to develop a low size, low weight, and low power solution that will be very attractive for use in battery operated machines and instruments. Electrostatic driven MEMS Mirrors inherently lead to low power scanning solutions, and the MEMS mirror scanning technology allows the reduction of size and weight of the solution. The complete low cost and reduced weight and size solution is very attractive feature for many applications including in drones where the payload of each part of the system included as a part of drone is of paramount importance. These features are also important for other applications such as ADAS applications in automotive market, or safety in smart city applications.

SUMMARY

A new system that comprises of two main sub-systems, a sensing system and a vector graphics laser projector fused together is presented. The sensing system could be based on any electromagnetic radiation sensor or other type of sensor. Example sensors include, without limitation, temperature, pressure, humidity, radar, or optical sensor. Information from sensors may be used by a processor to determine a physical property of an object or environment. The object may be an aspect of the environment or part of the environment for example and without limitation, ambient pressure, ambient sound, a floor, a wall, a person etc. The physical property may be for example and without limitation; 3 dimensional relative location, 2 dimensional relative location, geospatial location, speed, acceleration, distance, pressure level, sound level, temperature, reflectance, absorption, planarity, luminance, length, width, height, facial features, human presence, object presence, classification/identity (object or facial recognition), etc.

The sensor may be an electromagnetic radiation sensor system that uses a light source that is steered using a MEMS mirror over a field of view (FoV) and the same or additional MEMS mirror is used to image back the reflected light to generate a 3D point cloud, based on the return signal brightness, time of flight, or additional optical sensing methodologies. The vector graphics laser projection (VGLP) system preferably includes a MEMS mirror-based laser scanner for projecting vector graphic content using one or more visible laser beams to produce high brightness and high contrast projections. When sensing and projection functions are fused together the resulting system is able to image over the FoV, generate a 3D point cloud using the sensor, or get other information related to environment, and interact with the environment by projecting content using the VGLP.

Systems of the type described herein can be used in various markets such as commercial, consumer, industrial, automotive, etc. A good example of application is in robotics, where the system can be used for sensing the actively changing FoV and interacting with users, navigation, warning the robot's surroundings, and much more.

Both of the subsystems, sensing system and projection system, have been individually demonstrated as separate products, such as the SyMPL 3D Lidar from Mirrorcle Technologies Inc. (MTI) of Richmond, California for the sensor of the environment and the Playzer from MTI for the VGLP system. Both subsystems use MEMS mirrors to scan over their respective FoVs and are built on a common technical platform at the hardware and software layers, using MEMS controllers based on MCUs, and software APIs. The hardware and software allow for the systems to be fully programmable and reconfigurable, with the choice of scan FoV, frame rate, resolution, and so on, for the optical sensor. The content projected by the VGLP system can be any arbitrary vector graphic shape pattern, symbol, text, numeral or other character that can be adjusted in projection size, refresh rate and placement within the overall FoV.

Furthermore, MTI has already demonstrated full fusion of these two subsystems at the API level. The fusion enables the system to zoom in and perform higher resolution scans on the optical sensor side and direct the Playzer's content projection to highlight data from sensor or projects warning in specific areas, or address or interact with individual person or thing.

The fused system is designed to operate under 2 W of power, with some variation depending on the total Playzer's projection output brightness. The system is designed to fit within a small volume of 200 cm3 or smaller and weighing under 200 g. The overall small size and weight, with the low power consumption makes this system ideal for robotics and drone applications, and most other battery-operated applications in commercial and industrial spaces. The system is equally well suited for ADAS applications in automotive market as well as many other applications.

BRIEF DESCRIPTION OF THE DRAWINGS

FIG. 13A and FIG. 13B are block diagrams of the technical flow for the present invention In which FIG. 13A depicts a modular approach with individual electronics and controllers for the VGLP and sensing system integrated in common enclosure and API level and FIG. 13B depicts a unified hardware and software platform integrated in common enclosure, common MCU, and API level. Here a single processor interprets the optical sensing information, interfaces with a host system, and projects the information to the user

FIG. 19A-19C show a prototype of a system having an apparatus according to aspects of the present disclosure that combines a camera with a VGLP system where camera detects a person and the VGLP system projects some entertaining content in front of a person's feet.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In the interest of clarity, not all of the routine features of the implementations described herein are shown and described. It will be understood by those skilled in the art that in the development of any such implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of the present disclosure.

Figure 1A:
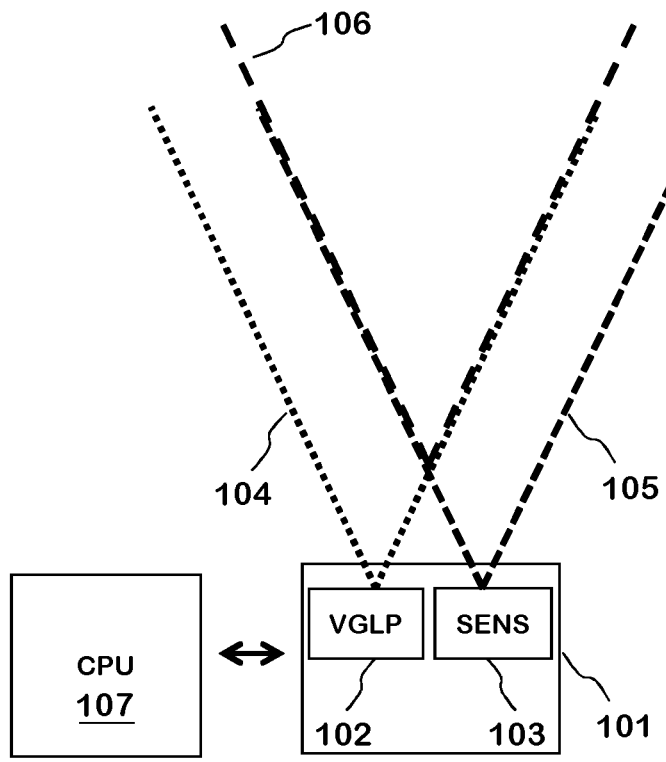
FIGS. 1A-1B illustrates a schematic overview of an apparatus according to aspects the present disclosure having a combination of optical sensing and laser projection systems and their respective shared fields of view (FoV).

According to an aspect of the present disclosure shown in FIG. 1A, a system consists of a Vector Graphics Laser Projection (VGLP) system 102 and sensing system (SENS) 103, coupled together on a mechanical mounting 101. The VGLP system is a MEMS mirror-based laser projection system. The sensor could be any type of electromagnetic radiation sensor or other type of sensor Example sensors include, without limitation, temperature, pressure, humidity, radar, or optical sensor. For some sensors the field of view may be a single point, meaning that the sensor measures one point parameter such as temperature, or humidity, while other sensors have an effective region or volume in which they sense environmental parameters (e.g., field of view for an optical sensor or radar or ultrasound), or distance (laser range finder) in some implementations. FIG. 1A shows the case for the sensor that has a field of view (FoV). In some implementations, the sensing system 103 and VGLP system 102 may be arranged such that their apertures are fully coaxial and the FoV for either of them can be adjusted, aligned, and/or expanded by commonly shared optics.

The projector and sensor are mounted in a way that fixes the relationship of their respective fields of view (FoVs), with 104 defining the VGLP system's FoV and 105 defining the sensor's FoV. The mounting 101 provides for them to have fixed FoVs and they are mounted to maximize their shared FoV 106 where the system can both sense and project. The system is coordinated and controlled via a unified software platform 107. According to aspects of the present disclosure the projector and sensor may be attached to the mounting 101 by either permanent means, e.g., welding, epoxying, riveting, and the like, or by removable means, e.g., screws, bolts, magnets, vacuum cups, Velcro, and the like.

Information from sensors may be used by the unified software platform running on a processor to determine a physical property of an object or environment. The object may be an aspect of the environment or part of the environment for example and without limitation, ambient pressure, ambient sound, a floor, a wall, a person, a face, etc. The physical property may be for example and without limitation; 3 dimensional relative location, 2 dimensional relative location, geospatial location, speed, acceleration, distance, pressure level, sound level, temperature, reflectance, absorption, planarity, luminance, length, width, height, facial features, human presence, object presence, classification/identity (object or facial recognition), etc.

Figure 1B:
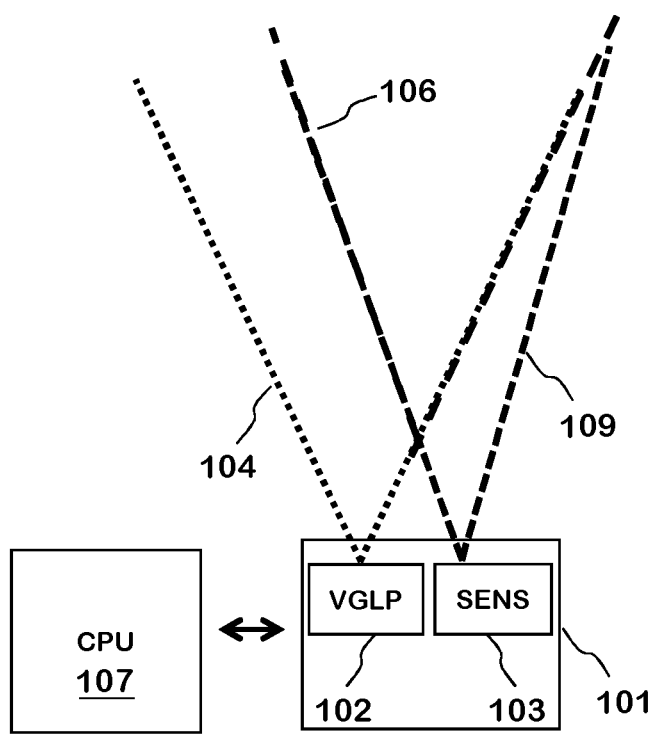

FIG. 1B shows the same basic implementation shown in FIG. 1A, but with the sensing system 103 FoV being a different resolution than the VGLP system 102. This different FoV 109 is shown as a smaller FoV. The resulting overlap still creates a shared FoV 106, where the system can both sense and project.

Figure 2:
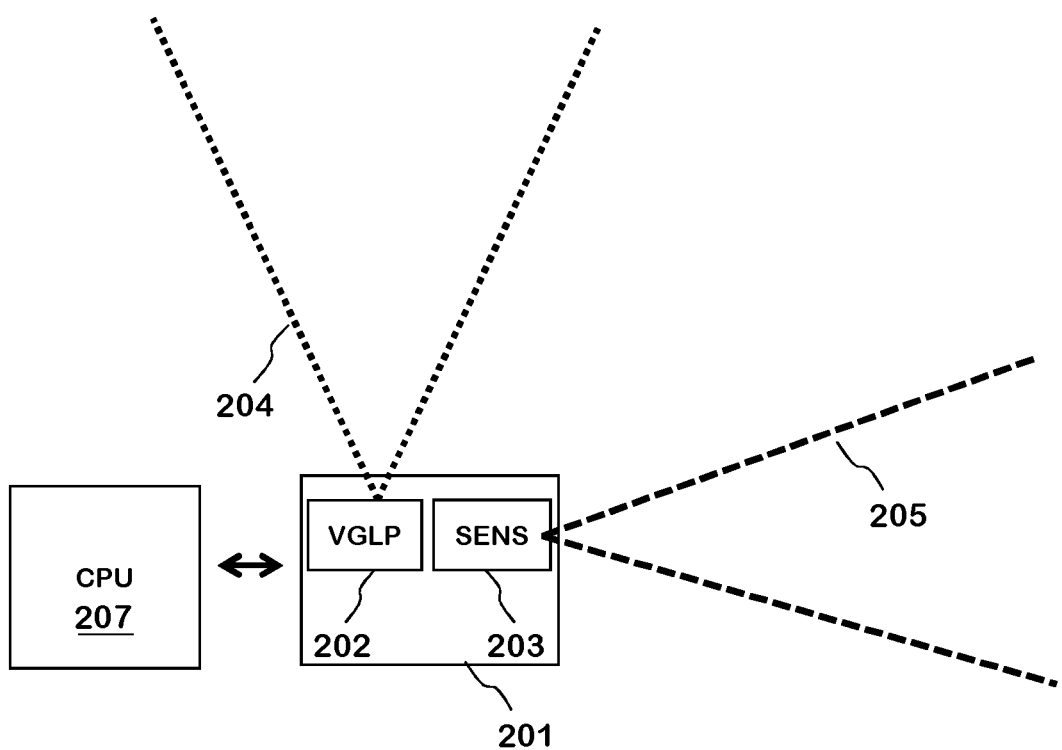
FIG. 2 illustrates a schematic overview of an apparatus according to aspects of the present disclosure having a combination of optical sensing and laser projection systems and their respective fields of view (FoV) that do not overlap.

FIG. 2 shows a system comprising a VGLP system 202 and a sensing system 203, coupled together on a mechanical mounting 201. The projector and sensor are mounted in a way to fix the relationship of their respective fields of view (FoVs), with 204 defining the VGLP system's FoV and 205 defining the sensor's FoV. The substrate provides for them to have fixed FoVs and they are mounted to sense and project in their respective areas, with no overlap in their FoVs. The system is coordinated and controlled via a unified software platform 207. It is understood that the sensing system may not have a sharply defined region of sensing as illustrated and that the region or volume within which it senses environmental parameters is not specifically a field of view. However, for the purposes of illustration of the invention it is shown as a conical or pyramidal volume typically seen in optical sensors such as lidar or radar sensors. Similarly, in embodiments where the sensor is another type of electromagnetic radiation sensor such as, for example and without limitation, a thermal camera or a camera for any range of wavelengths (visible range, NIR, IR, MWIR, LWIR, etc.). Additionally, regions of sensing may be different.

Figure 3:
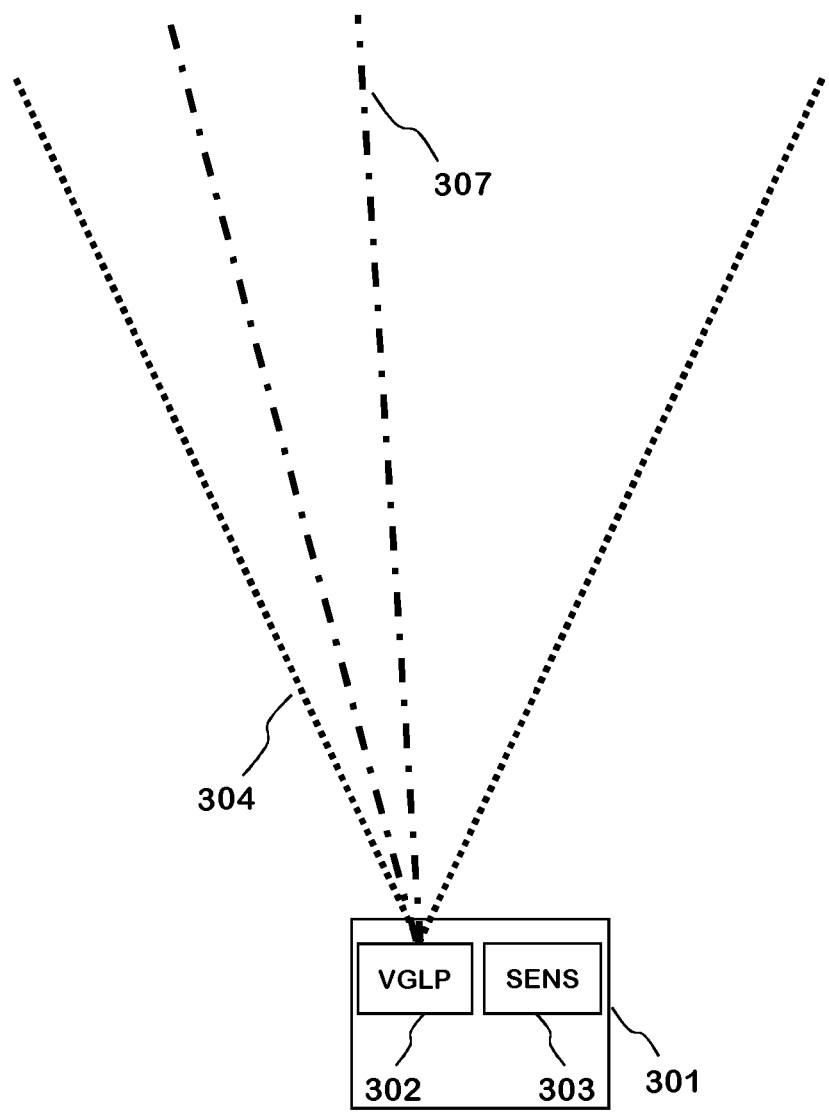
FIG. 3 illustrates the reconfigurability of a laser projection system's scan and FoV according to aspects of the present disclosure.

FIG. 3 shows the reconfigurability of the VGLP system 302. The system can reconfigure the arbitrary scan from the MEMS mirror to zoom in and address specific regions 307, within the total addressable FoV 304. This may also be termed as the Field of Regard (FoR) of the projector in which it can address select objects or targets with one or more laser beams with one or more wavelengths. The programmability of the MEMS mirror in the VGLP allows for the scan to be reconfigurable, and able to project any arbitrary shapes, glyphs, text, etc.

Figure 4:
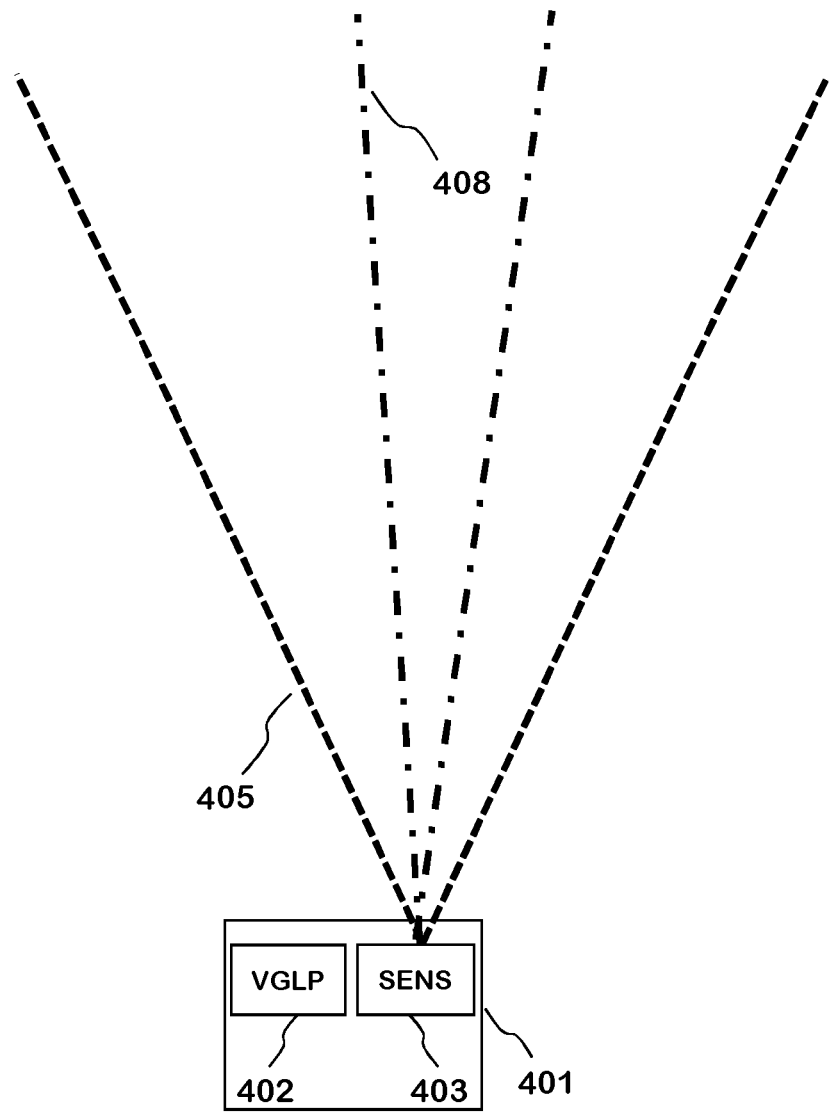
FIG. 4 illustrates the reconfigurability of an optical sensing system's scan and FoV according to aspects of the present disclosure.

FIG. 4 shows the reconfigurability of the sensing system 403. In some embodiments the sensing system may also have a reconfigurable region or volume of sensing ("field of view"). For example, a MEMS Mirror based 3D lidar could be used as the sensing system in which the MEMS mirror can be programmed to scan and to zoom in and scan specific regions 408, within the total addressable FoV 405. In such an embodiment where the sensing system is a 3D Lidar, the programmability of the beam steering element in the sensing system allows for the scan to be reconfigurable and able to image specific objects, allows for adding additional points and resolution to the scan, allows for variable refresh rates, etc. The same holds in an embodiment where the sensor system is a radar system.

In an implementation where the sensing system is a camera, the VGLP system can also have a different FoV than the camera and it may have a different lens, which can be controlled to zoom and choose the FoV.

Figure 5A:
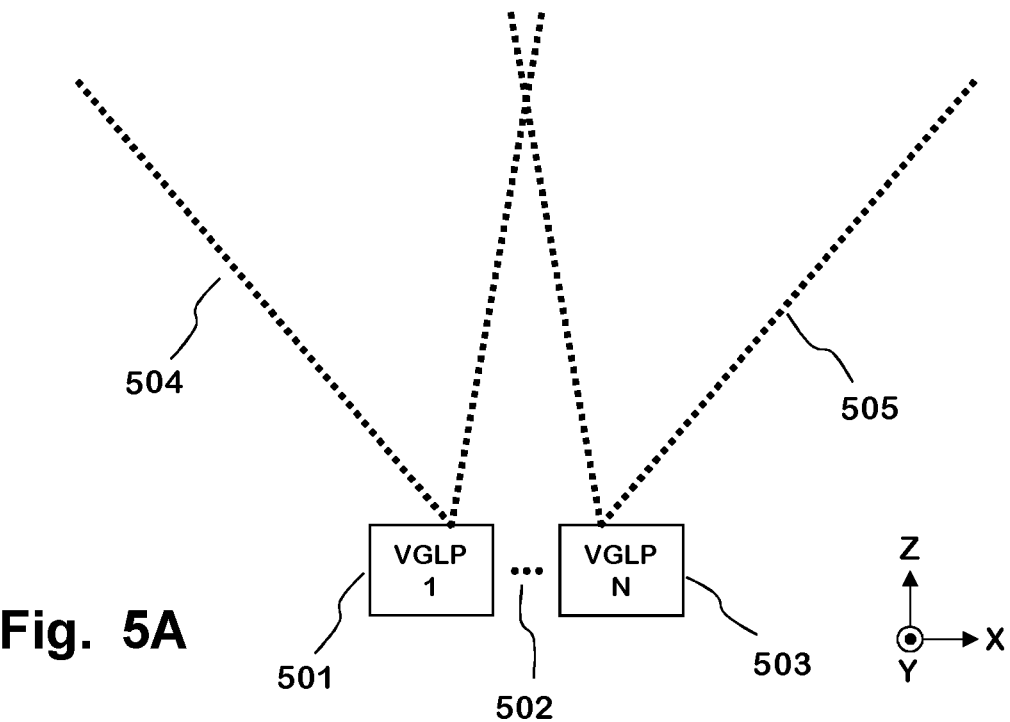
FIG. 5A-5B depicts an apparatus according to aspects of the present disclosure in which two or more projection systems are arrayed together either horizontally (FIG. 5A) or vertically (FIG. 5B) to achieve a combined larger FoV.

FIG. 5A shows that VGLP systems 501, 503 may be modular, and that an arbitrary number of them (indicated at 502) can be arrayed together along the X-axis. There are several reasons to array multiple VGLP systems in embodiments. Firstly, they can be arrayed in such a way that they increase the total projection FoV 504, 505. Secondly, arraying multiple projectors may be to project more complex content within the same shared FoV. Also, multiple individual VGLP systems can be arrayed and configured to project in different wavelengths. Any combination of these arraying concepts may also be utilized. For example, one projector may project slightly to the left, another projector to the right, achieving a larger total addressable projection FoV, and then a third projector may be added but with a different wavelength to project different information within that combined FoV of the first and second projector.

Figure 5B:
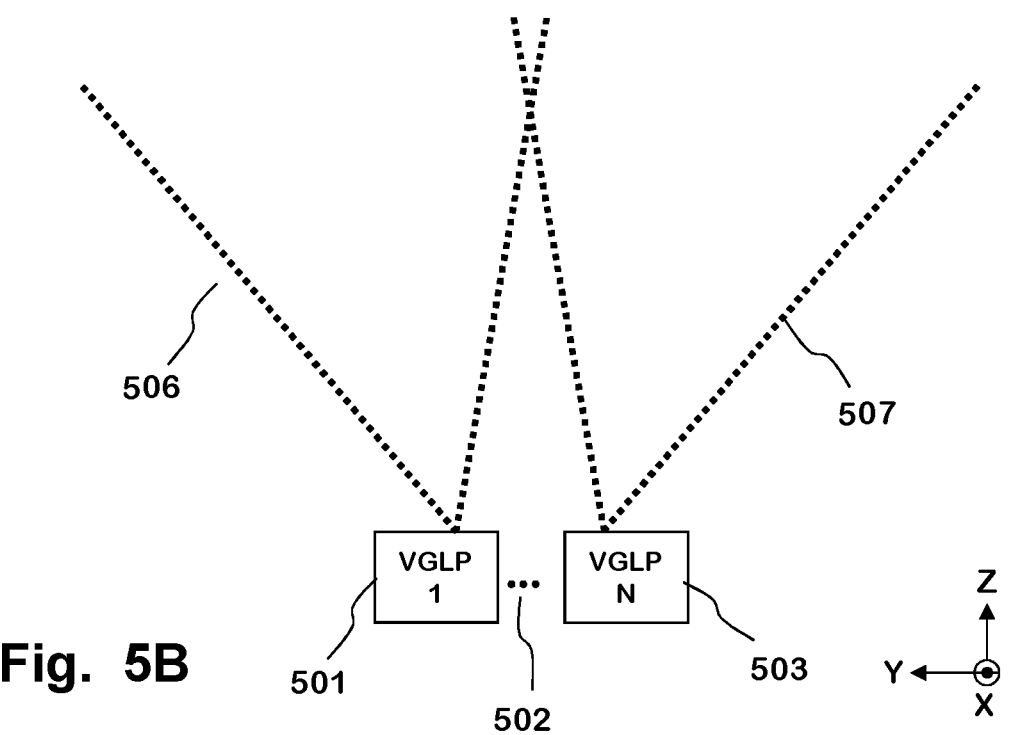

FIG. 5B shows that VGLP systems 501, 503 are modular, and that an arbitrary number of them (indicated at 502) can be arrayed together along the Y-axis to increase the projection FoV 506, 507. The combination of the systems in both X and Y-axes allows for the system to be modular and scalable for any application. This array of modules can be configured to work to project a single complex content, or can be configured as multiple individual systems that project in different wavelengths, or can be configured as multiple individual systems with FoVs that combine into one larger overall FoV, etc.

Figure 6A:
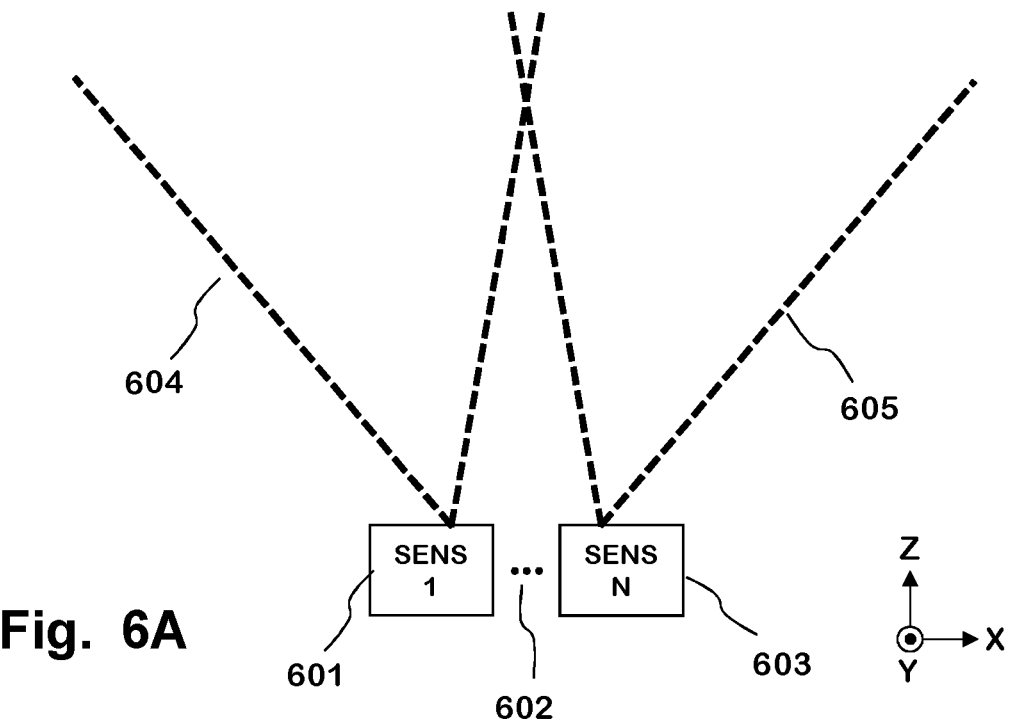
FIG. 6A-6B depicts an apparatus according to aspects of the present disclosure in which two or more optical sensing systems are arrayed together either horizontally (FIG. 6A) or vertically (FIG. 6B) to achieve a combined larger FoV.

FIG. 6A shows that the setup of the overall sensing system may also be modular. For example, multiple sensing systems 601, 603 can be arrayed together in arbitrary numbers (as indicated at 602) along the X-axis to combine the sensing FoVs 604, 605 into a larger overall FoV or sensing region or volume. This array of modules can be configured to work to address a larger area, or multiple individual subsections that can sense with different resolution, areas of regard, etc. In some implementations the overall sensing system is a combination of multiple types of sensors, arrayed together to observe more environmental parameters or inputs. For example 601 may be a radar sensor and 603 may be a camera sensor. There may be additional sensors arrayed along those two to add more sensing functionalities or to increase the functionality of any one of those.

Figure 6B:
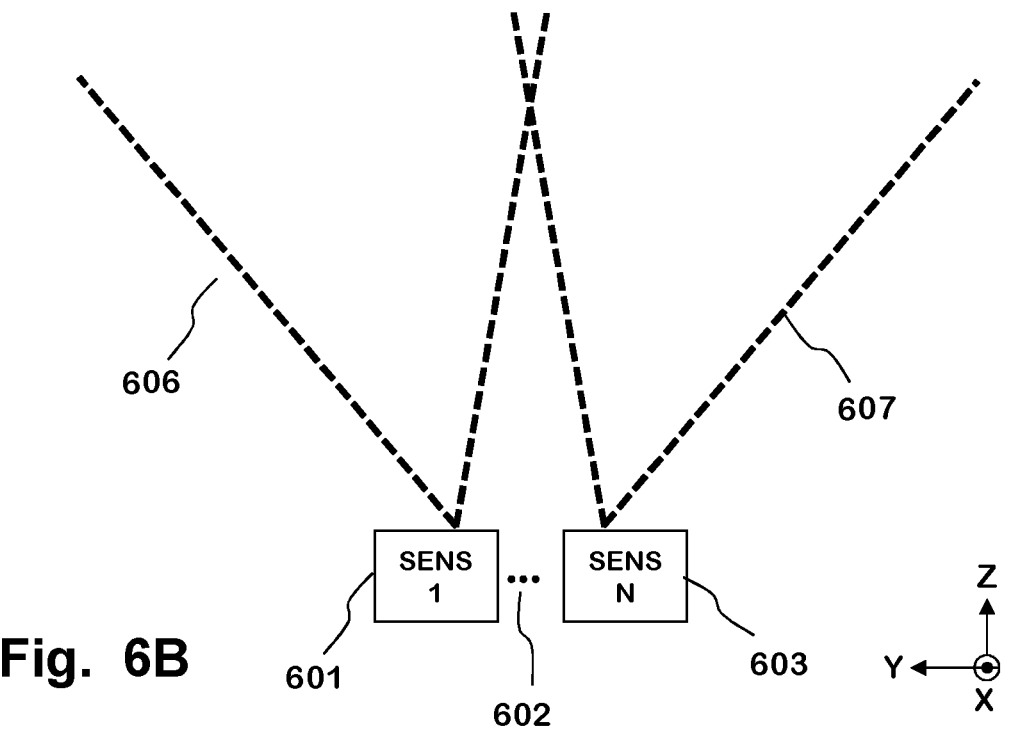

FIG. 6B shows that sensing systems 601, 603 are modular, and can be arrayed together in arbitrary numbers, as indicated at 602, along the Y-axis to increase the projection FoV 606, 607. The combination of systems in both X and Y-axes allows for the system to be modular and scalable for any application. This array of modules can be configured to work to address a larger area, or multiple individual subsections that can sense with different resolution, areas of regard, etc.

Figure 7A:
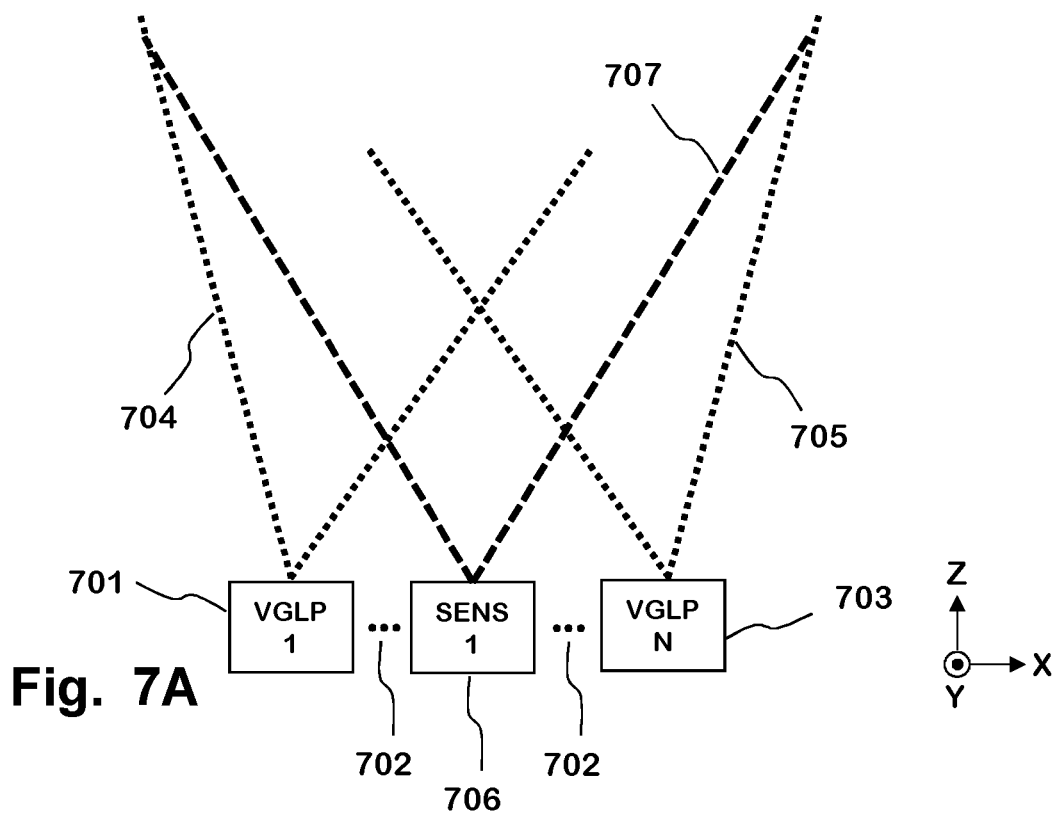
FIG. 7A depicts variations of combining multiple optical sensing systems and laser projection systems to create a combined larger FoV for both sensing and projection.
Figure 7B:
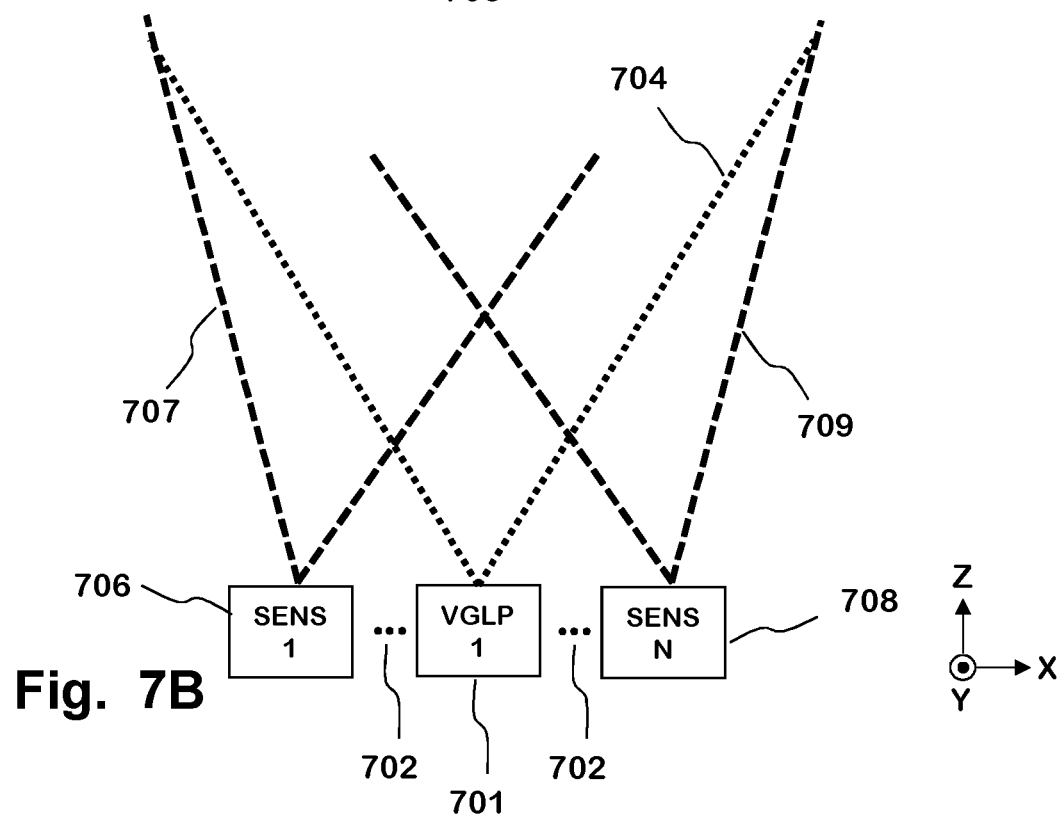
FIG. 7B depicts variations of combining multiple optical sensing systems and laser projection systems to project in multiple wavelengths for the laser projection.

FIG. 7A and FIG. 7B show that VGLP systems 701, 703 and sensing systems 706, 708 are modular and can be arrayed together in arbitrary numbers, as indicated at 702, along the X and Y axes to increase their overall projection and sensing FoVs. The VGLP systems' FoVs are defined by 704 and 705. The sensing system's FoVs are defined by 707 and 709. The combination of both the systems in X and Y-axes allows for the system to be modular and scalable for any application. This array of projection and sensing modules can be configured to work to sense a larger area, or multiple individual subsections with different resolution, areas of regard, and be able to project content out over that FoV, to highlight specific areas using different wavelengths, interact with other elements in the FoV, etc.

Figure 8:
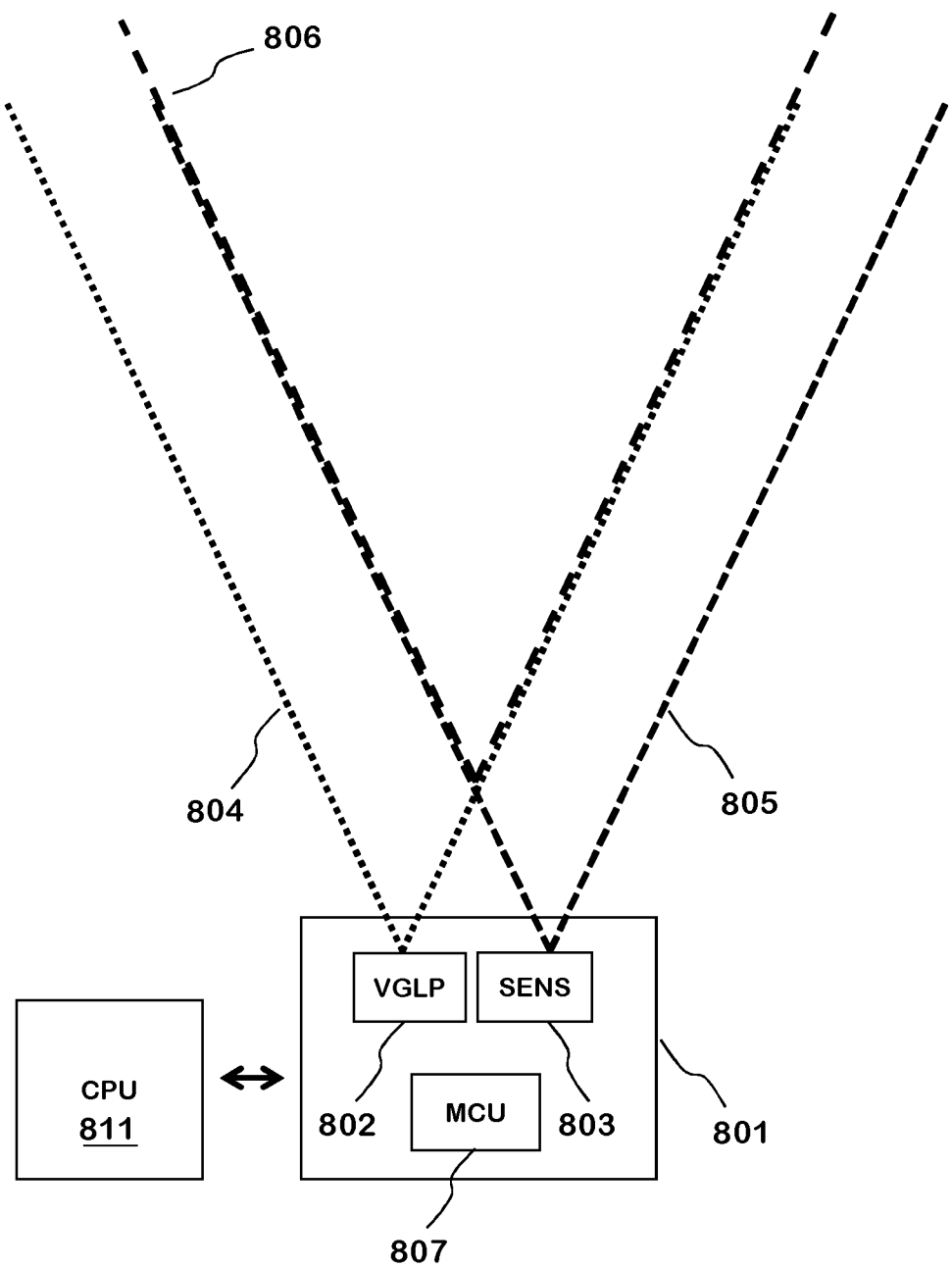
FIG. 8 illustrates a schematic overview of an apparatus according to aspects of the present disclosure with sensor and projection systems running from the same processor at the hardware level.

FIG. 8 illustrates an apparatus according to aspects of the present disclosure in which a system includes a projector (e.g., VGLP) system 802 and a sensing system 803, coupled together in mechanical housing 801. The projector and sensor systems are mounted in a way that fixes the relationship of their respective fields of view (FoVs), with 804 defining the VGLP system's FoV and 805 defining the sensor's FoV. The substrate provides for them to have fixed FoVs and they are mounted to maximize their shared FoV 806 where the system can both sense and project. The system is coordinated and controlled via a unified hardware processor 807 (MCU). The hardware processor controlling both sub-systems is located in the same mechanical housing 801 to simplify the user interface, reduce any processing delays as they are all handled on the same hardware processing layer.

Figure 9:
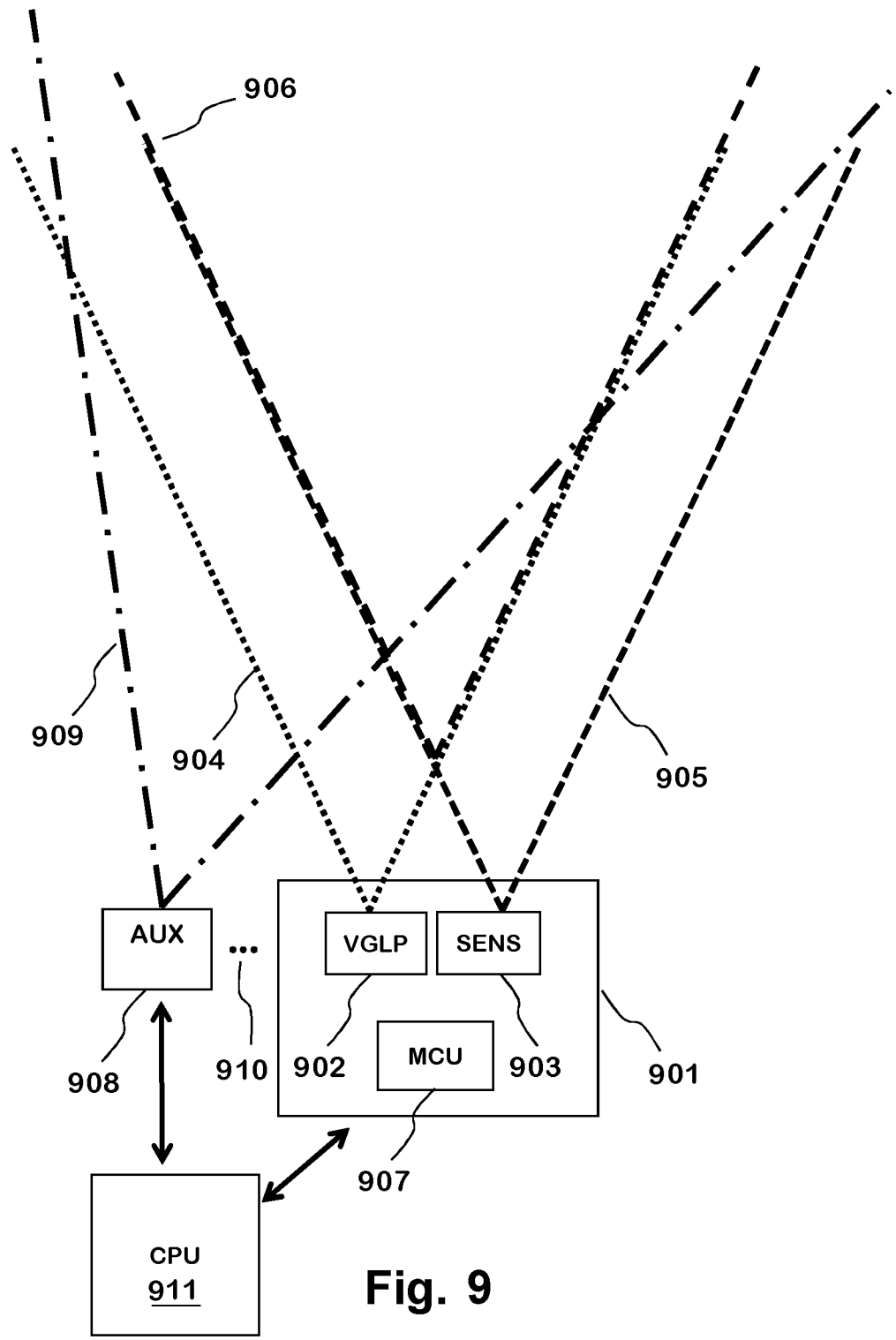
FIG. 9 illustrates a schematic overview of an apparatus according to aspects of the present disclosure working in conjunction with an external camera or other sensor(s).

FIG. 9 illustrates an implementation similar to that depicted in FIG. 7, where a system consists of a (VGLP) system 902 and a sensing system 903, coupled together in mechanical housing 901. The projector and sensor are mounted in a way that fixes the relationship of their respective fields of view (FoVs), with 904 defining the VGLP system's FoV and 905 defining the sensor's FoV. The substrate provides for them to have fixed FoVs and they are mounted to maximize their shared FoV 906 where the system can both sense and project. The system is coordinated and controlled via a unified hardware processor (MCU) 907. In this setup, an additional (auxiliary) sensor or camera (AUX) 908 is placed relative 910 to the sense and scan system 901. This additional sensor or camera has a separate field of view 909 that can be used for adding a secondary and independent sensing system for safety or reliability of the present invention that may be required for certain industry applications such as automotive, industrial, etc.

Figure 20:
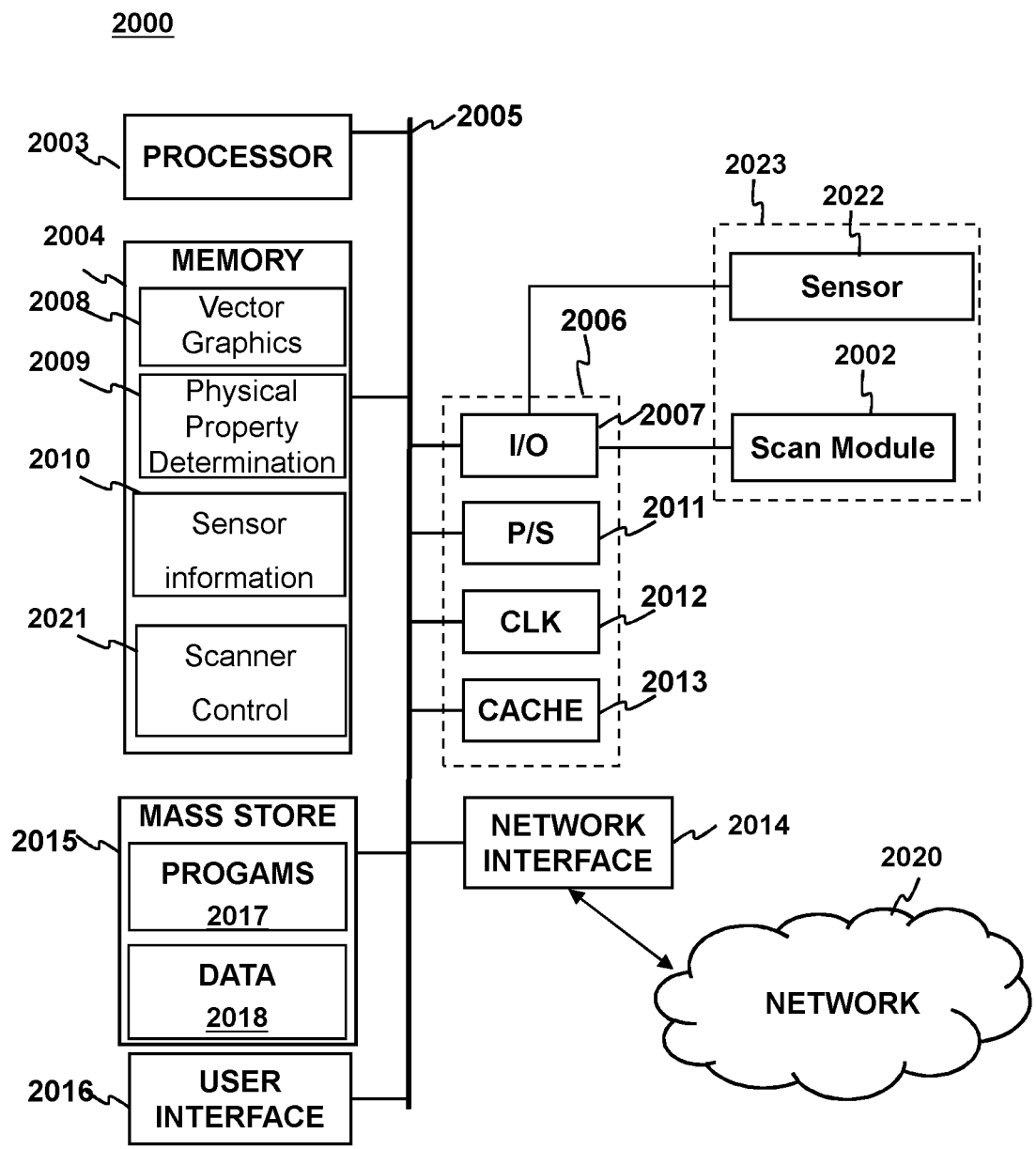
FIG. 20 is a schematic diagram of an apparatus according to aspects of the present disclosure.

FIG. 20 depicts a unified processor computing system with VGLP and sensor according to aspects of the present disclosure. The system may include a computing device 2000, such as single board computer (SBC), system on chip (SOC), microcontroller or similar, coupled to at one or more scan modules 2002 and one or more sensor systems 2022. The scan module 2002 may include a light projector such as vector graphics laser projection (VGLP) system which is a MEMS mirror-based laser scanner for projecting vector graphic content using one or more visible laser beams to produce high brightness and high contrast projections. The sensor system 2022 may include any electromagnetic radiation sensor or other type of sensor. Examples of sensors include, without limitation, temperature, pressure, humidity, radar, or optical sensor. The optical sensor may be an electromagnetic radiation sensor system that uses a light source that is steered using a MEMS mirror over a FoV and the same or additional MEMS mirror is used to image back the reflected light onto a light sensing element to generate a 3D point cloud, based on the return signal brightness, time of flight, or additional optical sensing methodologies. An optical time of flight sensor may be a specialized time of flight sensor such as a pulsed optical time of flight sensor, a Frequency Modulated Continuous Wave (FMCW) optical time of flight sensor or an Amplitude Modulated Continuous wave (AMCW) optical time of flight sensor. In some implementations, the scan module(s) 2002 and/or the sensor systems 2022 may each include an integrated processor (not shown) that controls certain aspects of their respective operation. For example, the sensor system(s) may include a microprocessor or microcontroller that converts signals from a sensor element from one data format to another, e.g., from analog to digital, and performs preliminary processing, such as scaling or calibration on the converted data. The scan module(s) may include a microprocessor or microcontroller that converts data in a text or image format into commands that control one or more laser sources and one or more scanning mirrors. The integrated processors may communicate with the computing device 2000, which can fuse the operation of the scan module(s) 2002 and sensor system(s) 2022 at firmware level or an application program interface (API) level.

The one or more sensor systems 2022 and one or more scan modules 2002 may be coupled to or otherwise attached to a common mechanical mounting 2023. The sensor system(s) and scan module(s) may be located within physical proximity to each other on the mechanical mounting 2023. Additionally a Processor 2003 and other components of the computing system 2000 may be located on the mechanical mounting 2023 and may be within physical proximity of the sensor system(s) 2022 and scan module(s) 2002. The physical proximity of the processor 2003 and other components of the computing system with the at least one scan module 2002 and at least one sensor 2022 may further reduce processing delays.

The computing device 2000 may include one or more processor units 2003, which may be configured according to well-known architectures, such as, e.g., single-core, dual-core, quad-core, multi-core, processor-coprocessor, cell processor, and the like. The computing device may also include one or more memory units 2004 (e.g., random access memory (RAM), dynamic random access memory (DRAM), read-only memory (ROM), and the like).

The processor unit 2003 may execute one or more programs, portions of which may be stored in the memory 2004 and the processor 2003 may be operatively coupled to the memory, e.g., by accessing the memory via a data bus 2005. The programs may be configured to display vector graphic content 2008 with the scan module 2002 using Scanner controls 2021 to command portions of the scanner such as lasers and MEMS mirrors. Additionally the Memory 2004 may contain programs that determine a physical property of an object 2009 from sensor information 2010. The sensor information 2010 may be information from the one or more sensors 2022 and the sensor information 2010 may interpret, filter or format the information from the one or more sensors to place it in a form compatible with other systems and/or programs.

The sensor information and vector graphics may also be stored as data 2018 in the Mass Store 2015. The processor unit 2003 is further configured to execute one or more programs 2017 stored in the mass store 2015. The programs 2017 (or portions thereof) may be configured, e.g., by appropriate programming, to determine a physical property of an object from sensor information or control the scanner which may be read directly from the mass store 2015 or loaded into memory 2004 from the mass store.

The computing device 2000 may also include well-known support circuits, such as input/output (I/O) 2007, circuits, power supplies (P/S) 2011, a clock (CLK) 2012, and cache 2013, which may communicate with other components of the system, e.g., via the bus 2005. The computing device may include a network interface 2014. The processor unit 2003 and network interface 2014 may be configured to implement a local area network (LAN) or personal area network (PAN), via a suitable network protocol, e.g., Bluetooth, for a PAN. Additionally the network interface may be an interconnect to other devices or computer systems such as a, Peripheral component interconnect (PCI), PCI express, serial interface, universal serial bus, or the like. The computing device may optionally include a mass storage device 2015 such as a disk drive, CD-ROM drive, tape drive, flash memory, or the like, and the mass storage device may store programs and/or data. The computing device may also include a user interface 2016 to facilitate interaction between the system and a user. The user interface may include a display, e.g., a monitor, Television screen, speakers, headphones or other devices that communicate information to the user. In addition, the user interface may include one or more input devices, e.g., buttons, switches, a keyboard, joystick, trackball, touch pad, touch screen, microphone, etc. The computing system 2000 may communicate with a network 2020 through the network interface. The network 2020 may be one or more other computers or devices configured to communicate with the computing device 2000. The files, sensor information and commands may be exchanged over the network 2020 between the computing systems and other computing systems and devices connected to the network.

Figure 10A:
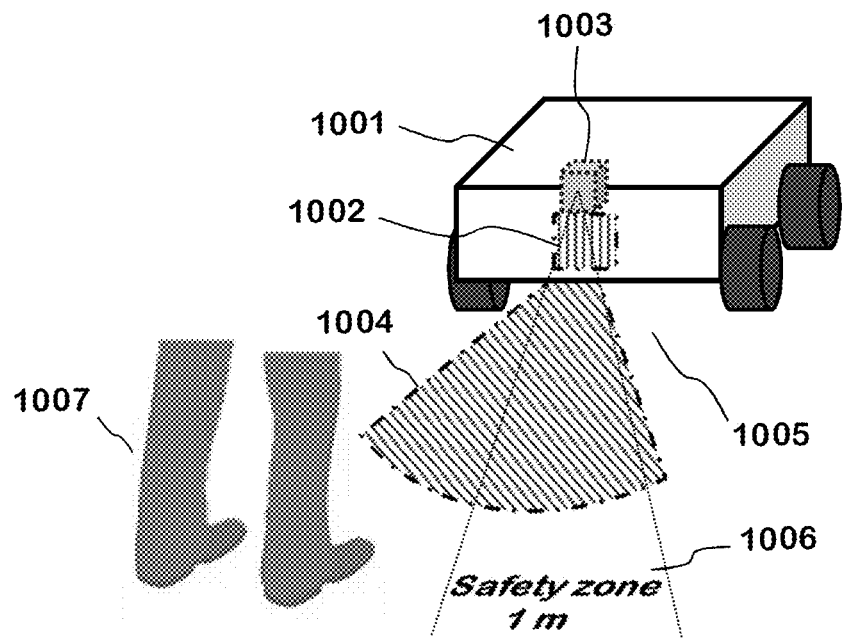
FIG. 10A and FIG. 10B illustrate an Autonomous Mobile Robot (AMR) according to aspects of the present disclosure, sensing obstacles in their path and projecting warnings and information in front of the robot.

FIG. 10A shows the use of an apparatus according to aspects of the present disclosure on an Autonomous Mobile Robot (AMR) 1001. In this implementation, a sensing system 1002 has a sensing field of view 1004 to detect obstacles 1007 within the robot's path. A VGLP system 1003 projects a warning message 1006 within the projector's field of view 1005.

Figure 10B:
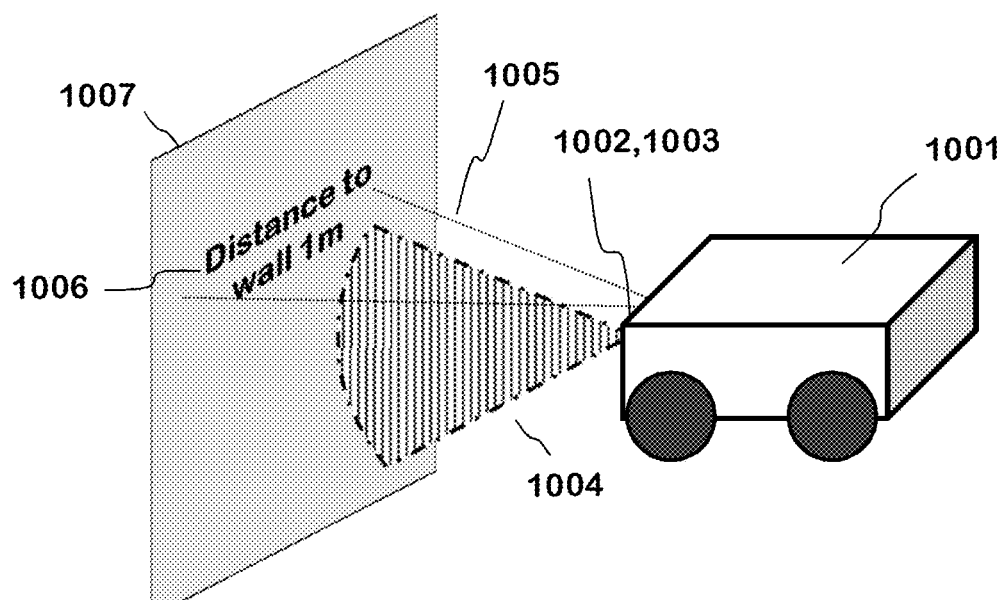

FIG. 10B shows another example of use of the Autonomous Mobile Robot (AMR) 1001 of FIG. 10A. The sensing system 1002 has a sensing field of view 1004 to detect any obstacles such as a wall 1007 within the robot's path. The VGLP system 1003 projects a warning and distance message 1006 within the projector's field of view 1005 onto the target wall 1007.

Figure 11A:
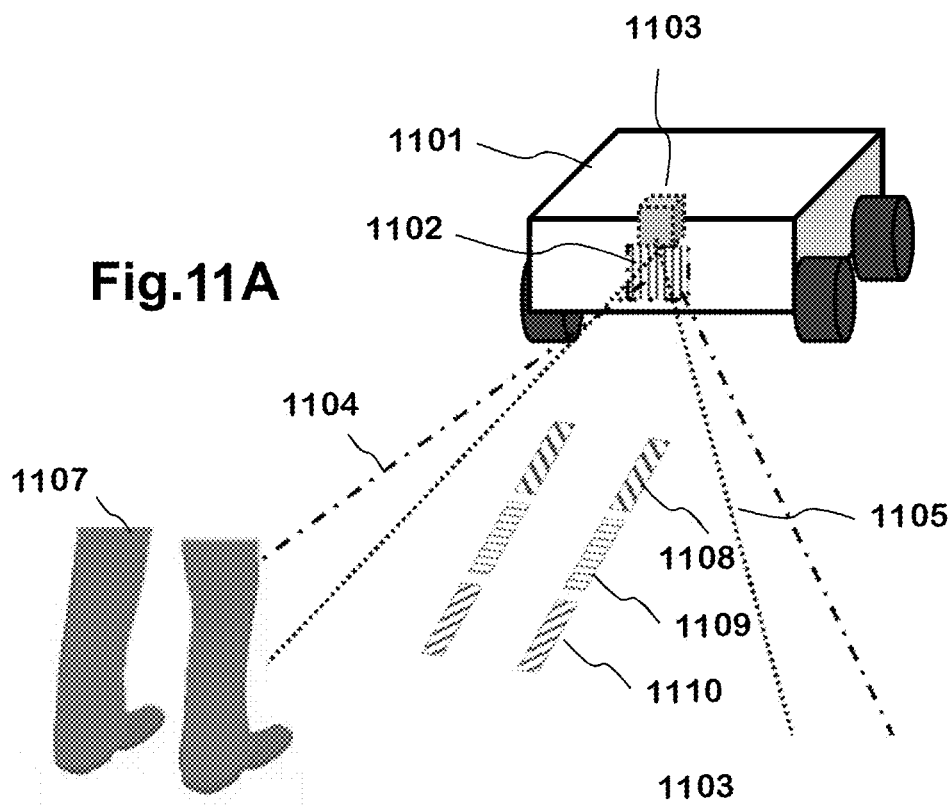
FIG. 11A and FIG. 11B illustrate an Autonomous Mobile Robot (AMR) an apparatus according to aspects of the present disclosure, sensing obstacles in their path and projecting warnings and information in front of the robot.

FIG. 11A shows another example of use of an apparatus according to aspects of the present disclosure on an Autonomous Mobile Robot (AMR) 1101. A sensing system 1102 has a sensing field of view 1104 to detect any obstacles 1107 within the robot's path. A VGLP system 1103 projects a highlighted path with various colors warning the user as they approach closer it is more dangerous. The colors could, for example, indicate a safe region 1110, a warning region 1109 and a danger region 1108 in different colors. In this example, these regions are all within the projector's field of view 1105.

Figure 11B:
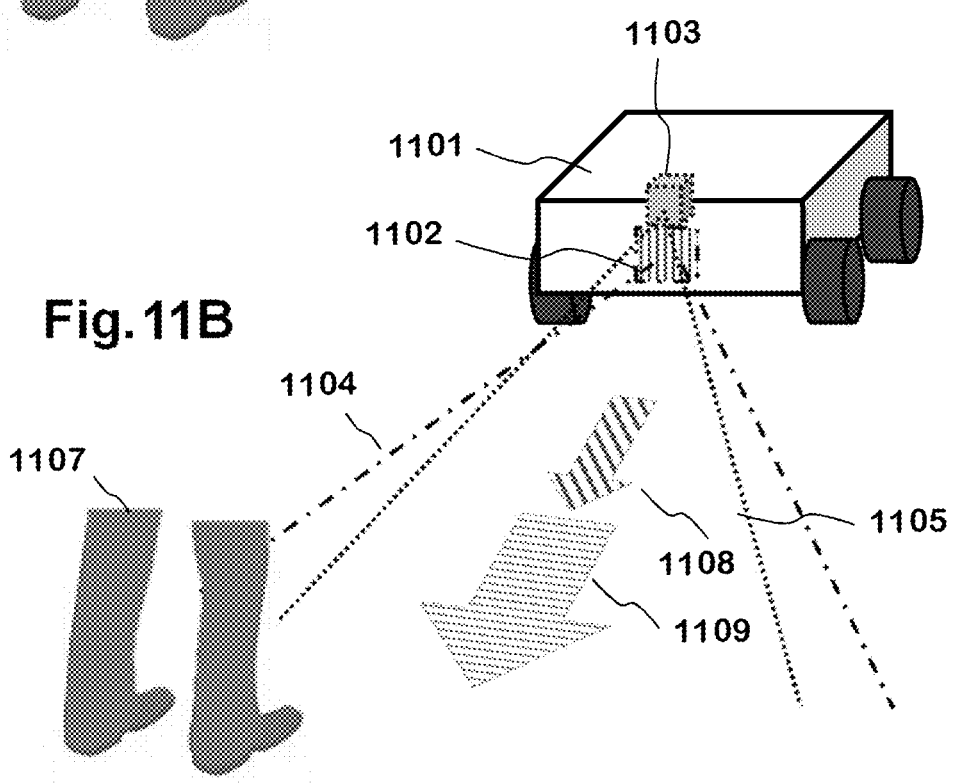

FIG. 11B shows another example of use of an apparatus according to aspects of the present disclosure on an Autonomous Mobile Robot (AMR) 1101. The sensing system 1102 has a sensing field of view 1104 to detect any obstacles 1107 within the robot's path. The VGLP system 1103 projects a highlighted path it is traveling in with flashing arrows. The colors and size may scale as it gets further away from the robot to alert users as they approach the robot, with a larger arrow 1109 further from the robot, and a smaller arrow closer to the robot 1108. These arrows are all within the projector's field of view 1105 in the illustrated example.

Figure 12:
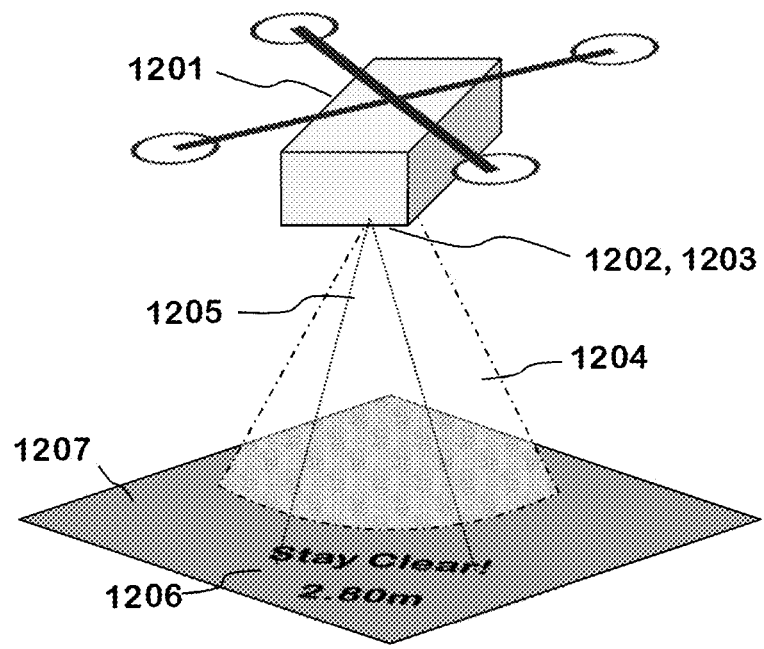
FIG. 12 illustrates a drone an apparatus according to aspects of the present disclosure, sensing obstacles in its path or ground and projecting warnings and information in its landing zone.

FIG. 12 shows another example of use of an apparatus according to aspects of the present disclosure on a drone 1201. A sensing system 1202 has a sensing field of view 1204 to detect any obstacles on the ground 1207 within the robot's path. The VGLP system 1203 projects a warning and distance message 1206 within the projector's field of view 1205 onto the ground landing area 1207.

Figure 13A:
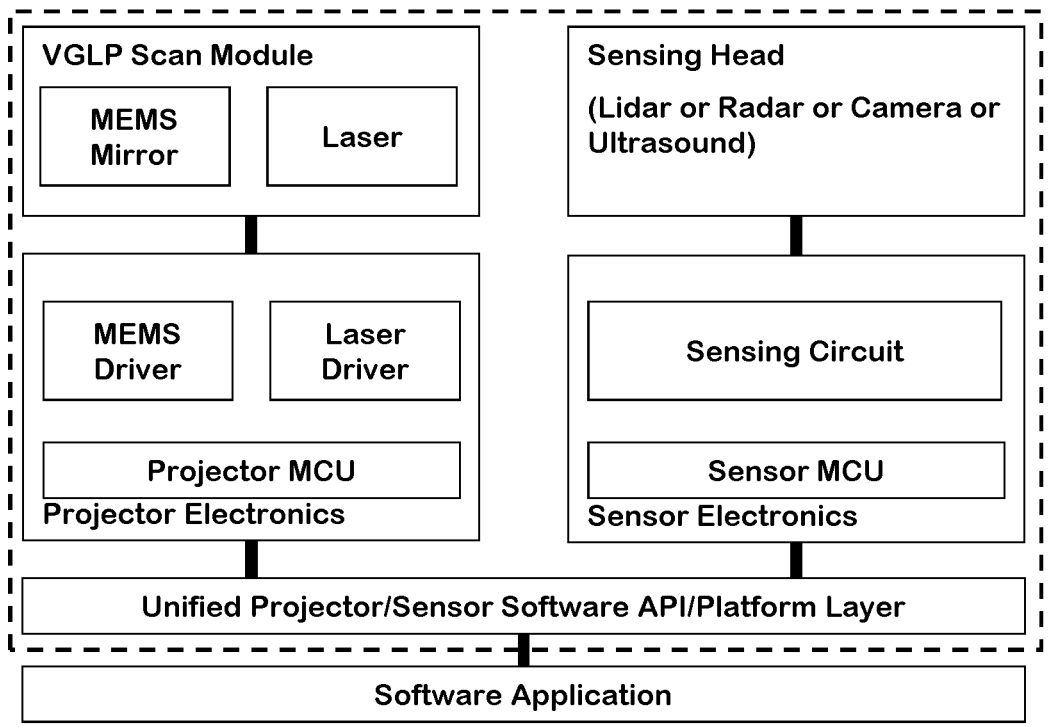
Figure 13B:
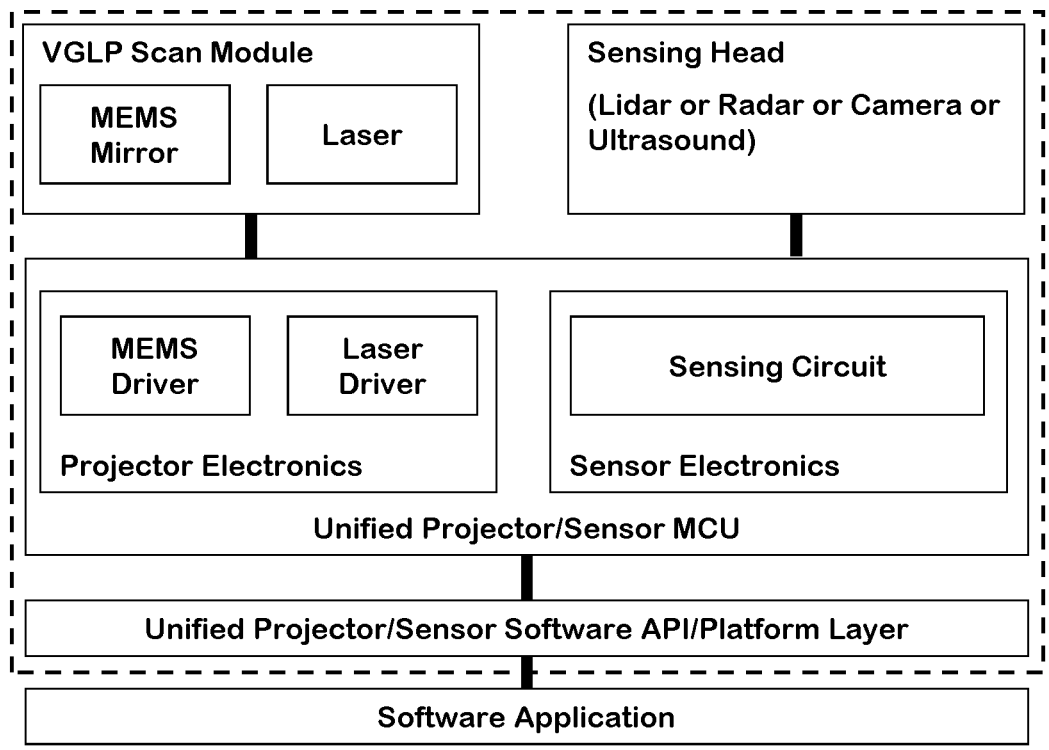

FIG. 13A and FIG. 13B are block diagrams of the technical flow for the present invention. FIG. 13A depicts a more modular approach with individual electronics and controllers for the VGLP and sensing system. Both these individual systems would interface with a unified API software platform layer and with a host system via a software application.

FIG. 13B describes an integrated hardware and software platform where a single processor interprets the optical sensing information, interfaces with a host system, and projects the information to the user in the VGLP display system. The single processor is able to process the 3D position information, and prepare the projection content onboard at the hardware layer, but can also communicate with the higher unified API software platform layer and application on the host computer.

Figure 14A:
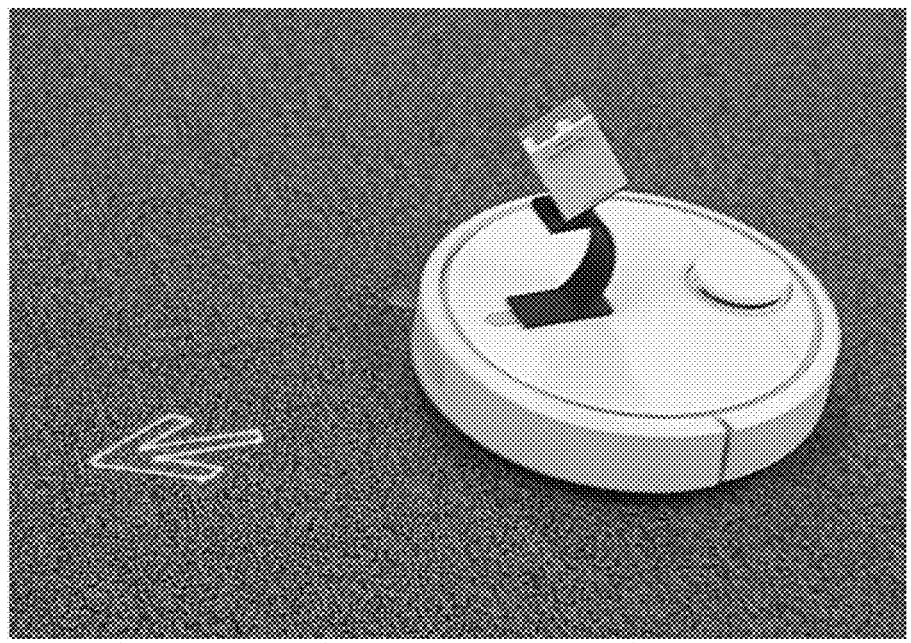
FIG. 14A shows a monochrome VGLP system mounted on a robot vacuum cleaner, displaying content in a single color according to an aspect of the present disclosure.

FIG. 14A shows a monochrome VGLP system mounted on a robot vacuum cleaner, displaying content in a single color, e.g., green. The Monochrome VGLP system is a single-color projector, where the hardware installed has only one laser module inside.

Figure 14B:
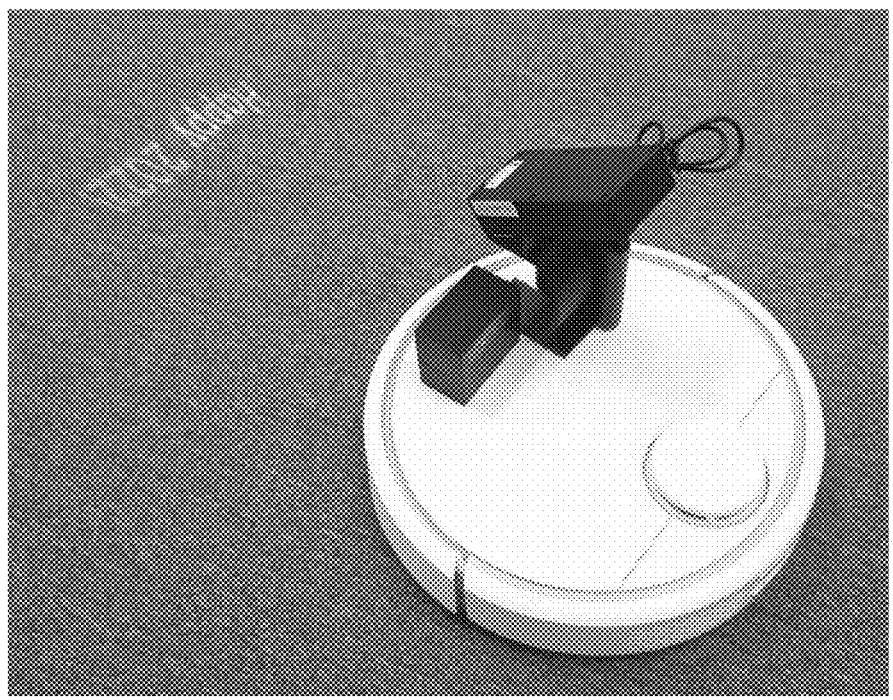
FIG. 14B shows a full color RGB VGLP system mounted on a robot vacuum cleaner, displaying content in various colors using a combination of RGB lasers according to aspects of the present disclosure.

FIG. 14B shows a full color RGB VGLP system mounted on a robot vacuum cleaner, displaying content in various colors using a combination of RGB lasers. The RGB VGLP system is a full color projector, where the hardware installed has three lasers combined together to form a single beam output to be scanned and projected from the module.

Figure 15A:
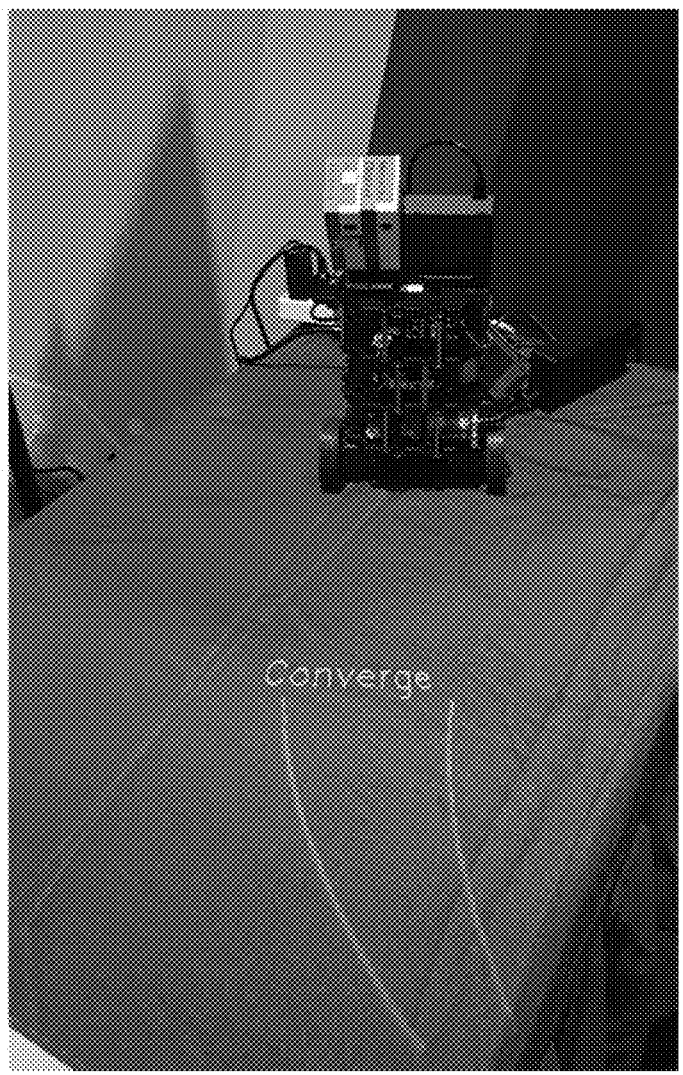
FIGS. 15A-15C depict apparatus according to aspects of the present disclosure displaying content in different colors simultaneously to convey additional meanings such as warnings, caution, etc. The multiple colors can also be used in conjunction with each other to project multiple pieces of information (FIG. 15C).
Figure 15B:
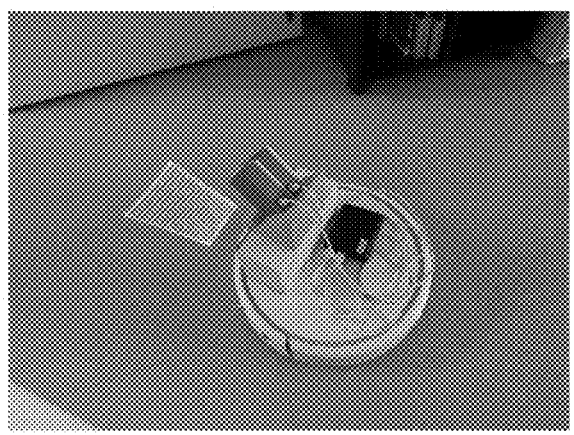
Figure 15C:
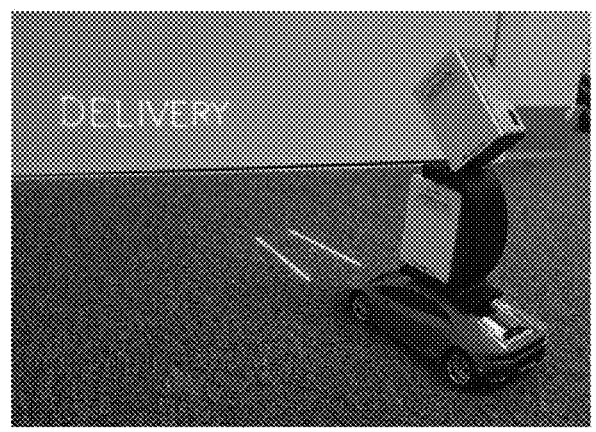
Figure 16A:
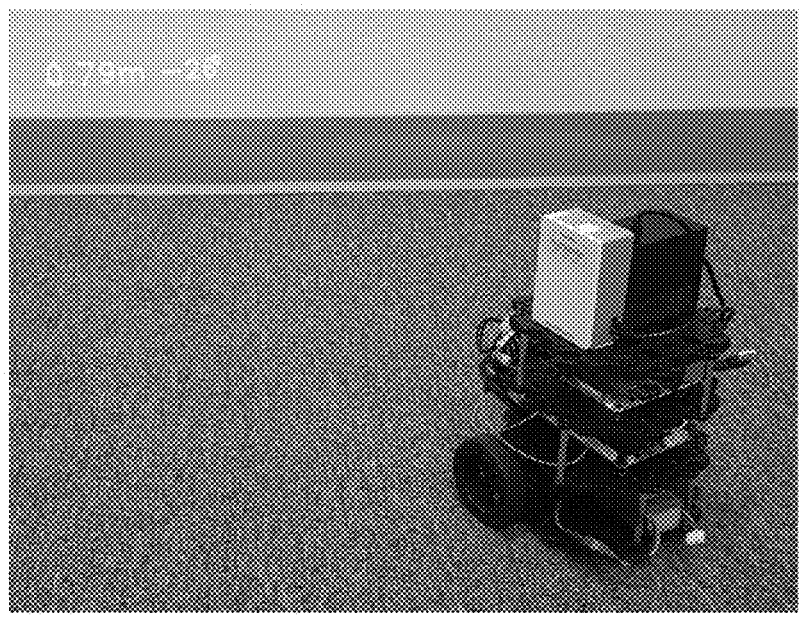
FIG. 16A depicts a moving robot equipped with an apparatus according to aspects of the present disclosure using a sensing system to measure distance and angle relative to the wall while moving and VGLP system to live-stream that data and project on the wall.

FIGS. 15A-15C depicts an implementation in which the same content can be displayed in different colors to indicate additional meanings of the messages being displayed such as warnings, caution, etc. FIG. 15A shows a green and red color Monochrome VGLP projector displaying information. FIG. 15B shows a red and green color Monochrome VGLP projector displaying information in graphical manner. FIG. 15C shows in red and green information projected on two separate surfaces using the two separate Monochrome VGLP systems FIG. 16A shows a full robot system using an optical sensor to measure distance and angle to a wall and streaming and projecting that information visually using a VGLP system. The robot can navigate using 3D point cloud information gathered by the optical sensor, and display information as needed to any users nearby. In this case, the VGLP is used for showing to user information of distance and angle to any obstacles in front of the robot.

Figure 16B:
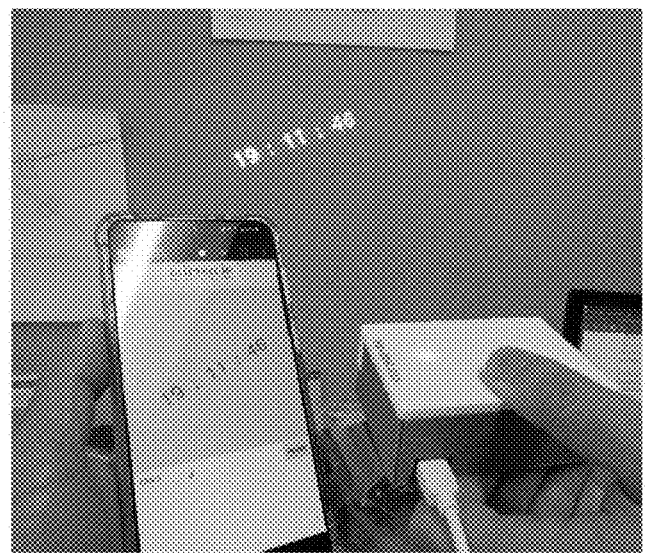
FIG. 16B depicts an apparatus according to aspects of the present disclosure in which a VGLP system works wirelessly via Bluetooth to display information.

FIG. 16B depicts an apparatus according to aspects of the present disclosure in which a VGLP system works wirelessly via Bluetooth to display information. In the illustrated example, the system communicates with a cellular phone to project content. Alternatively, the VGLP system may communicate with any suitable Bluetooth-capable device in a like manner to project content generated with, stored on, or selected by the device.

Figure 17A:
FIGS. 17A and 17B depict a cleaning robot outfitted with an apparatus according to aspects of the present disclosure that uses a LIDAR sensor to detect an obstacle, specifically a person's legs, and then project a greeting with a full color (RGB) VGLP system. The information is projected and customized with respect to person so that it is visible and readable by the person the robot detected.
Figure 17B:

FIG. 17A and FIG. 17B show a cleaning robot using a lidar sensor to detect an obstacle, specifically a person's legs, and then project a greeting with a full color (RGB) VGLP system. The information is projected and customized with respect to person so that it is visible and readable by the person the robot detected.

Figure 17C:
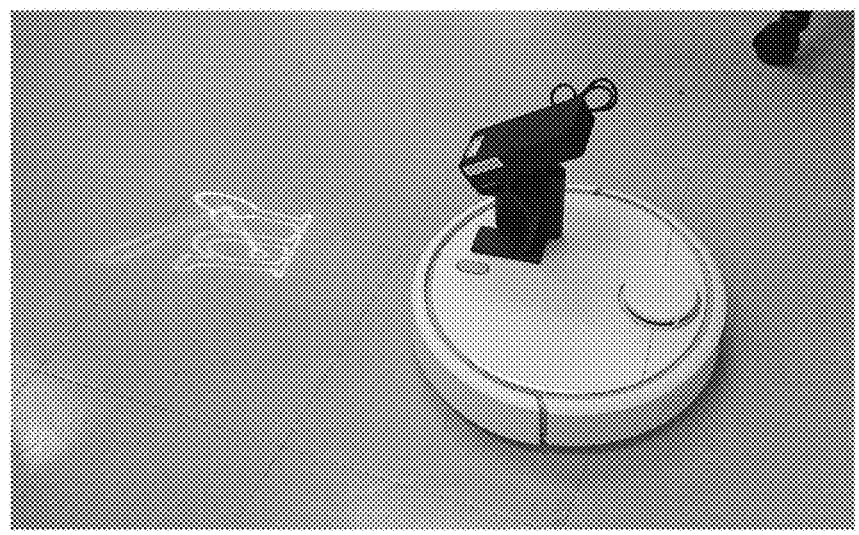
FIG. 17C depicts a cleaning robot with an apparatus according to aspects of the present disclosure that uses an ultrasonic sensor system to detect an obstacle and the sensor is combined with the RGB laser projector (VGLP system)—in this case displaying a company logo.

FIG. 17C shows a cleaning robot that is using ultrasonic sensor system to detect an obstacle and the sensor is combined with the RGB laser projector (VGLP system)—in this case displaying a company logo.

Figure 18A:
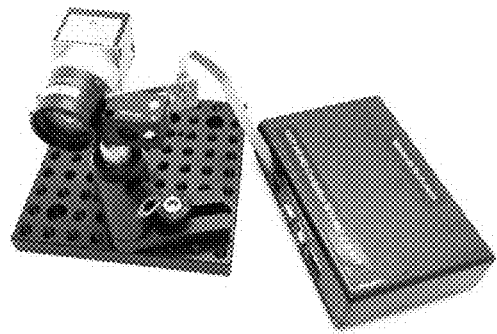
FIG. 18A shows a prototype of a system having an apparatus according to aspects of the present disclosure that combines a camera with a VGLP system.

FIG. 18A shows a prototype of a system which combines a camera with a VGLP system. In this case the integration is done at API level.

Figure 18B:
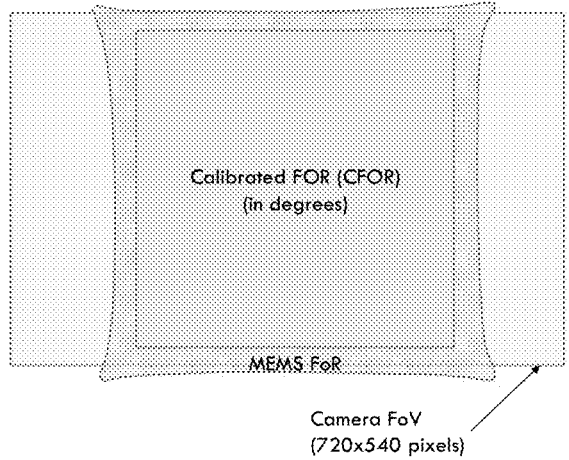
FIG. 18B shows a superposition of camera FoV and VGLP system field of regard for an apparatus according to aspects of the present disclosure. Within the overlapped area is the calibrated Field of Regard region where the two are fully calibrated with respect to each other.

FIG. 18B shows a superposition of camera FoV and VGLP system field of regard. Within the overlapped area is the calibrated Field of Regard region where the two subsystems are fully calibrated with respect to each other.

Figure 18D:
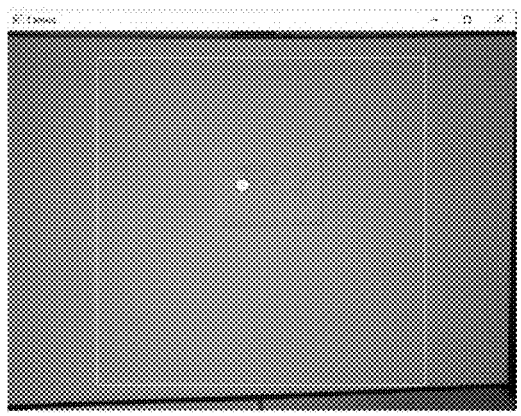
FIG. 18C-18D show a prototype of a system having an apparatus according to aspects of the present disclosure that combines a camera with a VGLP system where camera detects a certain feature in an image and the VGLP laser system projects a beam to that point.
Figure 18C:
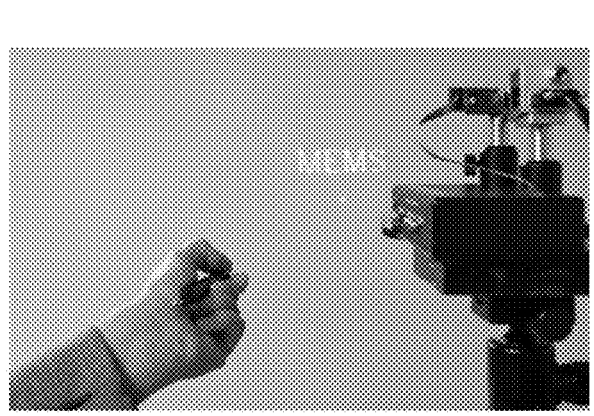

FIGS. 18C and 18D show a prototype of a fused system which combines a camera with a VGLP system where camera detects a certain feature in an image and the VGLP laser system augments information by projecting a beam to that point.

FIG. 19A-19C show a prototype of a system which combines a camera with a VGLP system where camera detects a person and the VGLP system projects some entertaining content or information that is of interest to person. The information has been projected in front of the person's feet.

BENEFITS

There are multiple benefits of apparatus of the type described in the present disclosure.

A single fused system that combines the process of sensing or detecting with projecting into a seamless process where data is processed locally in a timely manner and immediately projected in a different form and shape, without delay can greatly improve safety and allow for fast corrective action when needed.

The fusion of sensing and projection systems allows for fast reaction, and immediate feedback to user which could be done in different ways, by projecting data, projecting warning signs, giving directions, highlighting different paths, etc. Also, fusing sensing and multiple VGLP projectors or different colors from a single VGLP projector can be used to enrich communications and improve quality of information. Projecting in different colors or in multiple spaces simultaneously augments information further. For example, different colors can signify proximity to danger, or different colors can be used to mark different set of data, or separate color can be allocated to address specific user, or different set of data can be projected simultaneously into adjacent space for comparative viewing, etc.

With a single fused unit the processing of data can happen locally in a common MCU that is shred therefore using a shared MCU may reduce the number of components, which may reduce the size and weight of the total solution. Using one MCU instead of two may reduce the power consumption. This combined benefits with already low power consumption associated with MTI MEMS mirrors creates the most competitive fusion solution.

The overall combination of low power consumption, low weight, and small size leads also to low cost of the fused solution. All of these are very attractive features for many applications including in robots, drones, ADAS applications in automotive market, safety in smart city applications, and many other areas.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112, ¶ 6.

PUBLICATION REFERENCES

[1] Milanović, V., Castelino, K., McCormick, D., "Highly Adaptable MEMS-based Display with Wide Projection Angle," 2007 IEEE 20th International Conference on Micro Electro Mechanical Systems (MEMS), Hyogo, Japan, Jan. 21-25, 2007, pp. 143-146

[2] Milanović, V., "Linearized Gimbal-less Two-Axis MEMS Mirrors," 2009 Conference on Optical Fiber Communication, San Diego, CA, USA, Mar. 22-26, 2009, pp. 1-3

[3] Miner, A., Milanović, V., "High Temperature Operation of Gimbal-less Two-Axis Micromirrors," 2007 IEEE/LEOS International Conference on Optical MEMS and Nanophotonics, Hualien, Taiwan, Aug. 12-Jul. 16, 2007, pp. 91-92

[4] Milanovié, V., Kasturi, A., Hachtel, V., "High brightness MEMS mirror based head-up display (HUD) modules with wireless data streaming capability," Proc. SPIE 9375, MOEMS and Miniaturized Systems XIV, 93750A, San Francisco, CA, USA, Feb. 27, 2015

[5] Kasturi, A., Milanović, V., Lovell, D., Hu, F., Ho, D., Su, Y., Ristic, Lj., "Comparison of MEMS Mirror LiDAR Architectures," Proc. SPIE 11293, MOEMS and Miniaturized Systems XIX, 112930B, San Francisco, CA, Feb. 28, 2020

[6] Wengefeld, T., Hochemer, D., Lewandowski, B., Köhler, M., Beer, M., Gross, H., "A Laser Projection System for Robot Intention Communication and Human Robot Interaction," 2020 29th IEEE International Conference on Robot and Human Interactive Communication (RO-MAN), Virtual Conference, Aug. 31-Sep. 4, 2020, pp. 259-265

[7] Vogel, C., Walter C., Elkmann, N., "A Projection-based Sensor System for Safe Physical Human-Robot Collaboration," 2013 IEEE/RSJ International Conference on Intelligent Robots and Systems (IROS), Tokyo, Japan, Nov. 3-7, 2013, pp. 5359-5364

[8] Andersson, N., Argyrou, A., Nagele, F., Ubis, F., Campos, U E., Ortiz de Zarate, M., Wilterdink, R., "AR-Enhanced Human-Robot-Interaction—Methodologies, Algorithms, Tools," 6th CIRP Conference on Assembly Technologies and Systems (CATS), Procedia CIRP, Vol. 44, 2016, pp. 193-198

[9] Vogel, C., Walter C., Elkmann, N., "Exploring the possibilities of supporting robot-assisted work places using a projection-based sensor system," 2012 IEEE International Symposium on Robotic and Sensors Environments Proceedings, Magdeburg, Germany, Nov. 16-18, 2012, pp. 67-72

[10] Sheridan, T B., "HUMAN-ROBOT INTERACTION: STATUS AND CHALLENGES," Human Factors, Vol. 58, no. 4, June 2016, pp. 525-532

[11] Zaeh, M F., Vogl, W., "Interactive Laser-Projection for Programming Industrial Robots," 2006 IEEE/ACM International Symposium on Mixed and Augmented Reality, Santa Barbara, CA, USA, Oct. 22-25, 2006, pp. 125-128

[12] Ali, R., Liu, R., He, Y., Nayyar, A., Qureshi, B., "Systematic Review of Dynamic Multi-Object Identification and Localization: Techniques and Technologies," IEEE Access, Vol. 9, pp. 122924-122950

[13] Vogel, C., Poggendorf, M., Walter, C., Elkmann, N., "Towards Safe Physical Human-Robot Collaboration: A Projection-based Safety System," 2011 IEEE/RSJ International Conference on Intelligent Robots and Systems, San Francisco, CA, USA, Sep. 25-30, 2011, pp. 3355-3360

The above cited publication references are incorporated herein by reference for all purposes.

What is claimed is:

1. An apparatus, comprising:
a light detection and ranging (LIDAR) sensor configured to detect light;
a scan module having a micro-electromechanical system (MEMS) mirror configured to deflect one or more laser beams to project vector graphic content;
a unified processor configured to receive information from the LIDAR sensor to determine a physical property of an object or an environment and to project vector graphic content using the scan module, wherein the unified processor reduces processing delays by fusion of processing of both determination of the physical property of the object or the environment and vector graphic content;
a mechanical mounting for both the scan module and the LIDAR sensor wherein the scan module and the LIDAR sensor are attached to the mechanical mounting.

2. The apparatus of claim 1 wherein the fusion of processing of both the vector graphic content and the determination of the physical property of the object or the environment is performed at a firmware layer of the unified processor.

3. The apparatus of claim 1 wherein the fusion of processing of both the vector graphic content and the determination of the physical property of the object or the environment is performed at a software layer of the unified processor.

4. The apparatus of claim 1 wherein the mechanical housing further includes the unified processor whereby a physical proximity of the unified processor, LIDAR sensor and the scan module further reduces processing delays of the determination of the physical property of the object or the environment and vector graphic content.

5. The apparatus of claim 1 wherein the LIDAR sensor is an optical time of flight sensor.

6. The apparatus of claim 1 wherein the LIDAR sensor is a Frequency Modulated Continuous Wave optical time of flight sensor.

7. The apparatus of claim 1 wherein the LIDAR sensor is an Amplitude Modulated Continuous Wave optical time of flight sensor.

8. The apparatus of claim 1 wherein the LIDAR sensor is a pulsed optical time of flight sensor.

9. The apparatus of claim 1 wherein the LIDAR sensor is an infrared sensor.

10. The apparatus of claim 1 wherein the physical property of the object is a 3 dimensional position of the object.

11. The apparatus of claim 1 wherein the physical property of the object is a speed of the object.

12. The apparatus of claim 1 wherein the object is a floor or a wall.

13. The apparatus of claim 1 wherein the processor is part of a single board computer.

14. The apparatus of claim 1 further comprising one or more additional scan modules configured to project additional vector graphic content.

15. The apparatus of claim 1 wherein the LIDAR sensor detects light from a Field of View (FOV) and the apparatus further comprises one or more additional LIDAR sensors configured to detect light from an additional FOV.

16. The apparatus of claim 1 further comprising an auxiliary sensor wherein the auxiliary sensor is coupled to the mechanical mounting.

17. The apparatus of claim 1 wherein a projection area of the vector graphic content overlaps a FOV of the LIDAR sensor.

18. The apparatus of claim 1 wherein processing of the vector graphic depends upon the determination of the physical property of the object or the environment.

19. The apparatus of claim 1 wherein the physical property of the object is a speed of the object traveling from the apparatus and the projection of the graphic content includes an indication of the speed of the apparatus.

20. The apparatus of claim 1 wherein the physical property of the object is a distance of the object from the apparatus and the graphic content includes the distance of the object from the apparatus.

21. An apparatus, comprising:
a light detection and ranging (LIDAR) sensor configured to detect light and sense a physical property of an object or an environment;
a scan module having a micro-electromechanical system (MEMS) mirror configured to deflect one or more laser beams to project vector graphic content related to the physical property of the object or the environment;
a unified processor configured to reduce processing delays by fusion of processing of both determination of the physical property of the object or the environment and vector graphic content;
and a mechanical mounting for both the scan module and the LIDAR sensor wherein the scan module and the LIDAR sensor are attached to the mechanical mounting.

22. The apparatus of claim 21 wherein the physical property is a distance of the object.

23. The apparatus of claim 21 wherein the physical property is a proximity of the object.

24. The apparatus of claim 21 wherein the physical property is a velocity or acceleration of the object or of the apparatus relative to the environment.

25. The apparatus of claim 21 wherein the physical property is a presence of the object.

26. The apparatus of claim 21 wherein the physical property is at least one of 3 dimensional shape measurements and 3-dimensional orientation measurements.

27. The apparatus of claim 21 wherein the physical property is a presence of a human in the environment.

28. The apparatus of claim 21 wherein the physical property is a facial feature and the object is a human face, wherein determination of the physical property of the object or the environment includes facial recognition.

29. The apparatus of claim 21 wherein determination of the physical property of the object or the environment includes recognition of the object.

30. The apparatus of claim 21 wherein the LIDAR sensor is further configured to detect visible light wavelengths.

31. The apparatus of claim 21 wherein the LIDAR sensor is further configured to detect light at infrared wavelengths.

32. The apparatus of claim 21 wherein the LIDAR sensor is further configured to sense the physical property of the object or environment from the detected light.

33. The apparatus of claim 21 wherein the light is one or more of the one or more laser beams.

34. The apparatus of claim 21 wherein the LIDAR sensor is an optical time of flight sensor.

35. The apparatus of claim 21 wherein the LIDAR sensor is an Amplitude Modulated Continuous Wave optical time of flight sensor.

36. The apparatus of claim 21 wherein the LIDAR sensor is a pulsed optical time of flight sensor.

37. The apparatus of claim 21 wherein the LIDAR sensor is a Frequency Modulated Continuous Wave (FMCW) optical time of flight sensor.

38. The apparatus of claim 21 wherein the LIDAR sensor is configured to sense the physical property of the object or environment within a field of view and the apparatus further comprising one or more additional sensors wherein the one or more additional sensors are configured to expand the field of view for sensing the physical property of the object or environment.

39. The apparatus of claim 38, wherein the LIDAR sensor and the one or more additional sensors are arranged in an array configuration.

40. The apparatus of claim 21 wherein the LIDAR sensor has bandwidth to sense the physical property of the object or environment and the apparatus further comprising one or more additional sensors wherein the one or more additional sensors are configured to increase the bandwidth to sense the physical property of the object or environment.

41. The apparatus of claim 40, wherein the LIDAR sensor and the one or more additional sensors are arranged in an array configuration.

42. The apparatus of claim 21 further comprising at least one additional sensor configured to sense a different physical property of the object or environment.

43. The apparatus of claim 42, wherein the LIDAR sensor and the one or more additional sensors are arranged in an array configuration.

44. The apparatus of claim 21 wherein the scan module has an FOV for projecting vector graphic content related to the physical property of the object or the environment and the apparatus further comprising at least one additional scan module configured to increase the FOV for projecting vector graphic content.

45. The apparatus of claim 44, wherein the scan module and the one or more additional scan modules are arranged in an array configuration.

46. The apparatus of claim 21 wherein the one or more lasers have a laser light wavelength bandwidth for projecting vector graphic content related to the physical property of the object or the environment and the apparatus further comprising one or more additional scan modules configured to increase a range of laser light wavelength bandwidths for projecting vector graphic content.

47. The apparatus of claim 46, wherein the scan module and the one or more additional scan modules are arranged in an array configuration.

48. The apparatus of claim 21 further comprising one or more additional scan modules configured to display additional vector graphic content.

49. The apparatus of claim 48, wherein the scan module and the one or more additional scan modules are arranged in an array configuration.

50. The apparatus of claim 21 wherein the LIDAR sensor and scan module are arranged such that their apertures are fully coaxial and an FOV for either of them can be adjusted, aligned, and/or expanded by commonly shared optics.

\* \* \* \* \*